(12) United States Patent
Zhang et al.

(10) Patent No.: US 10,148,476 B2
(45) Date of Patent: Dec. 4, 2018

(54) PREAMBLE SYMBOL GENERATION AND RECEIVING METHOD, AND FREQUENCY-DOMAIN SYMBOL GENERATION METHOD AND DEVICE

(71) Applicant: Shanghai National Engineering Research Center of Digital Television Co., Ltd., Shanghai (CN)

(72) Inventors: Wenjun Zhang, Shanghai (CN); Guanbin Xing, Shanghai (CN); Ge Huang, Shanghai (CN); Hongliang Xu, Shanghai (CN); Dazhi He, Shanghai (CN); Yunfeng Guan, Shanghai (CN)

(73) Assignee: Shanghai National Engineering Research Center of Digital Television Co., Ltd., Shanghai (CN)

( * ) Notice: Subject to any disclaimer, the term of this patent is extended or adjusted under 35 U.S.C. 154(b) by 0 days.

(21) Appl. No.: 15/304,857

(22) PCT Filed: Apr. 16, 2015

(86) PCT No.: PCT/CN2015/076808
§ 371 (c)(1),
(2) Date: Oct. 17, 2016

(87) PCT Pub. No.: WO2015/158292
PCT Pub. Date: Oct. 22, 2015

(65) Prior Publication Data
US 2017/0207943 A1 Jul. 20, 2017

(30) Foreign Application Priority Data

Apr. 5, 2014 (CN) .......................... 2014 1 0184919
Apr. 16, 2014 (CN) .......................... 2014 1 0153040

(Continued)

(51) Int. Cl.
*H04L 27/26* (2006.01)
*H04L 5/00* (2006.01)
(Continued)

(52) U.S. Cl.
CPC .......... *H04L 27/2607* (2013.01); *H04L 5/001* (2013.01); *H04L 5/0007* (2013.01);
(Continued)

(58) Field of Classification Search
CPC ....................... H04L 27/2627; H04L 27/2607
See application file for complete search history.

(56) References Cited

U.S. PATENT DOCUMENTS 6,438,367 B1 * 8/2002 Crawford ............ H04L 63/0428
370/203
9,680,601 B2 * 6/2017 Hong .................... H04L 1/0041
(Continued)

FOREIGN PATENT DOCUMENTS

CN 101960810 A 1/2011
CN 102075480 A 5/2011

*Primary Examiner* — Jean B Corrielus
(74) *Attorney, Agent, or Firm* — Kilpatrick Townsend & Stockton, LLP

(57) ABSTRACT

Provided are a preamble symbol generation method and receiving method, and a relevant frequency-domain symbol generation method and a relevant device, characterized in that the method comprises: generating a cyclic prefix according to a partial time-domain main body signal truncated from a time-domain main body signal; generating a modulation signal based on a portion or the entirety of the partial time-domain main body signal; and generating time-domain symbols based on at least one of the cyclic prefix, the time-domain main body signal and the modulation signal, wherein the preamble symbol contains at least one of the time-domain symbols. Therefore, using the entirety or a portion of a certain length of a time-domain main body signal as a prefix, it is possible to implement coherent (Continued)

detection, which solves the issues of performance degradation with non-coherent detection and differential decoding failure under complex frequency selective fading channels; and generating a modulation signal as a postfix based on the entirety or a portion of the above truncated time-domain main body signal enables the generated preamble symbol to have sound fractional frequency offset estimation performance and timing synchronization performance.

19 Claims, 5 Drawing Sheets

(30) Foreign Application Priority Data

| Apr. 24, 2014 | (CN) | 2014 1 0168180 |
|---|---|---|
| Apr. 28, 2014 | (CN) | 2014 1 0175323 |
| Apr. 29, 2014 | (CN) | 2014 1 0177035 |
| Apr. 30, 2014 | (CN) | 2014 1 0182962 |
| May 5, 2014 | (CN) | 2014 1 0185112 |
| May 28, 2014 | (CN) | 2014 1 0229558 |
| Jun. 12, 2014 | (CN) | 2014 1 0259080 |
| Jun. 19, 2014 | (CN) | 2014 1 0274626 |
| Jul. 10, 2014 | (CN) | 2014 1 0326504 |
| Dec. 10, 2014 | (CN) | 2014 1 0753506 |
| Jan. 26, 2015 | (CN) | 2015 1 0039510 |
| Jan. 30, 2015 | (CN) | 2015 1 0052202 |
| Jan. 30, 2015 | (CN) | 2015 1 0061935 |
| Feb. 6, 2015 | (CN) | 2015 1 0064118 |
| Feb. 12, 2015 | (CN) | 2015 1 0076151 |
| Feb. 12, 2015 | (CN) | 2015 1 0076155 |
| Feb. 12, 2015 | (CN) | 2015 1 0076216 |

(51) Int. Cl.
*H04L 25/02* (2006.01)
*H04L 7/00* (2006.01)

(52) U.S. Cl.
CPC ........ *H04L 7/0008* (2013.01); *H04L 25/0202* (2013.01); *H04L 27/266* (2013.01); *H04L 27/2613* (2013.01); *H04L 27/2626* (2013.01); *H04L 27/2627* (2013.01); *H04L 27/2655* (2013.01); *H04L 27/2666* (2013.01); *H04L 27/2692* (2013.01); *H04L 27/2678* (2013.01); *H05K 999/99* (2013.01)

(56) References Cited

U.S. PATENT DOCUMENTS

| 2008/0014969 | A1* | 1/2008 | Laroia | H04W 68/00 455/458 |
|---|---|---|---|---|
| 2010/0067599 | A1* | 3/2010 | Dayal | H04B 7/0667 375/267 |
| 2012/0113955 | A1* | 5/2012 | Cho | H04W 48/08 370/330 |
| 2012/0170680 | A1* | 7/2012 | Stern | H04L 5/0039 375/299 |
| 2013/0034054 | A1* | 2/2013 | Wu | H04L 27/2602 370/328 |
| 2013/0272364 | A1 | 10/2013 | Zhang | |
| 2014/0301282 | A1* | 10/2014 | Paiva | H04L 5/0062 370/329 |
| 2015/0229507 | A1* | 8/2015 | Kim | H04L 27/2692 375/260 |

* cited by examiner

PREAMBLE SYMBOL GENERATION AND RECEIVING METHOD, AND FREQUENCY-DOMAIN SYMBOL GENERATION METHOD AND DEVICE

This application is a U.S. National Stage of International Application No. PCT/CN2015/076808, filed on Apr. 16, 2015, designating the United States, and claiming priority to Chinese Patent Application No. 201410153040.X, filed Apr. 16, 2014; Chinese Patent Application No. 201410168180.4, filed Apr. 24, 2014; Chinese Patent Application No. 201410175323.4, filed Apr. 28, 2014; Chinese Patent Application No. 201410177035.2, filed Apr. 29, 2014; Chinese Patent Application No. 201410182962.3, filed Apr. 30, 2014; Chinese Patent Application No. 201410184919.0, filed May 4, 2014; Chinese Patent Application No. 201410185112.9, filed May 5, 2014; Chinese Patent Application No. 201410229558.7, filed May 28, 2014; Chinese Patent Application No. 201410259080.2, filed Jun. 12, 2014; Chinese Patent Application No. 201410274626.1, filed Jun. 19, 2014; Chinese Patent Application No. 201410326504.2, filed Jul. 10, 2014; Chinese Patent Application No. 201410753506.X, filed Dec. 10, 2014; Chinese Patent Application No. 201510039510.4, filed Jan. 26, 2015; Chinese Patent Application No. 201510052202.5, filed Jan. 30, 2015; Chinese Patent Application No. 201510061935.5, filed Jan. 30, 2015; CN, 201510064118.5, filed Feb. 6, 2015; Chinese Patent Application No. 201510076155.8, filed Feb. 12, 2015; Chinese Patent Application No. 201510076151.X, filed Feb. 12, 2015; Chinese Patent Application No. 201510076216.0, filed Feb. 12, 2015, the content of which are hereby incorporated by reference in its entirety.

TECHNICAL FIELD

The present invention relates to the technical field of communications, and especially to a preamble symbol generation and receiving method and a preamble symbol generation method and device.

BACKGROUND ART

Typically, in order to enable a receiving end of an OFDM system to correctly demodulate data sent by a transmitting end, the OFDM system has to realize accurate and reliable time synchronization between the transmitting end and the receiving end. At the same time, since the OFDM system is very sensitive to the frequency offset of a carrier, the receiving end of the OFDM system also has to adopt an accurate and efficient carrier frequency estimation method, so as to precisely estimate and correct the carrier frequency offset.

At present, a signal of an OFDM system is composed of physical frames, and each physical frame generally has one synchronization frame head referred to as a preamble symbol or bootstrap, for realizing the time and frequency synchronization between a transmitting end and a receiving end. The preamble symbols is known to both the transmitting end and the receiving end, and is generally referred to as a P1 symbol. The usage of the P1 symbol or bootstrap symbol includes:

1) Enabling the receiving end to make a detection rapidly to determine whether a signal transmitted in a channel is a signal desired to be received;

2) providing a basic transmission parameter (e.g. the number of FFT points, frame type information, etc.), so that the receiving end can performing subsequent receiving processing;

3) detecting an initial carrier frequency offset and a timing error, and compensating to achieve frequency and timing synchronization; and 4) an emergency alarm or broadcast system wakeup.

A P1 symbol design based on an existing time-domain structure is proposed in existing standards such as DVB_T2 standard, which well achieves the above-mentioned functions. However, there are still some limitations on low-complexity receiving algorithms. By way of example, in the case of long and multi-path channels with 1024, 542, or 482 samples, rough timing synchronization will cause great deviation, thus leading mistake when estimating integral frequency offset of the carrier in the frequency domain. Further, in a complex frequency selective fading channel, for example in a long multi-path channel, DBPSK differential decoding method may also fail. Moreover, since the DVB_T2 time-domain structure does not include a cyclic prefix, when channel estimation needs to be conducted by utilizing the preamble symbol, the frequency-domain channel estimation performance thereof will be severely degraded.

SUMMARY OF THE INVENTION

The problem to be solved by the present invention is that at present, in DVB_T2 standard and other standards, the time-domain structure of the preamble symbol in the DVB_T2 standard cannot be applied to coherent detection, in a complex frequency selective fading channel, the DBPSK differential decoding method of the preamble symbol would fail, and the receiving algorithm will probably fail.

In order to solve the problem, the embodiments of the present invention provide the following preamble symbol generation method and receiving method, and a relevant frequency-domain symbol generation method and relevant device.

Method I

The embodiments of the present invention provide a preamble symbol generation method, characterized by comprising the following steps: generating a cyclic prefix according to a partial time-domain main body signal truncated from a time-domain main body signal; generating a modulation signal based on a portion or the entirety of the partial time-domain main body signal; and generating a time-domain symbol based on at least one of the cyclic prefix, the time-domain main body signal and the modulation signal, wherein the preamble symbol contains at least one the time-domain symbol.

Optionally, the provided preamble symbol generation method further comprise such features: the time-domain symbol is generated based on the cyclic prefix, the time-domain main body signal and the modulation signal which are arranged successively, and the preamble symbol contains at least one said time-domain symbol.

Optionally, the provided preamble symbol generation method further comprise such features: the generation steps of the cyclic prefix and the modulation signal contains: obtaining the cyclic prefix by directly truncating from the rear of the time-domain main body signal, and obtaining the modulation signal by modulating the entirety or a portion of the partial time-domain main body signal corresponding to the cyclic prefix.

Optionally, the provided preamble symbol generation method further comprise such features: the generation steps of the cyclic prefix and the modulation signal contains: generating the cyclic prefix by processing a portion truncated from the rear of the time-domain main body signal according to a first predefined processing rule, and generating the modulation signal by processing a portion truncated from the rear of the time-domain main body signal according to a second predefined processing rule, the first predefined processing rule comprises: direct copy, or multiplying a fixed coefficient or a predefined variable coefficient; and the second predefined processing rule comprises: conducting modulation when the first predefined processing rule is direct copy, or when the first predefined processing rule is multiplying a fixed coefficient or a predefined variable coefficient, multiplying the corresponding coefficient as well and then conducting modulation.

Optionally, the provided preamble symbol generation method further comprise such features: the length of the modulation signal does not exceed the length of the cyclic prefix.

Optionally, the provided preamble symbol generation method further comprise such features: generating the modulation signal based on the partial time-domain main body signal comprises the following steps: setting a frequency shift sequence; and multiplying a portion or the entirety of the partial time-domain main body signal by the frequency shift sequence to obtain the modulation signal of the time-domain main body signal.

Optionally, the provided preamble symbol generation method further comprise such features: a modulation frequency offset value of the frequency shift sequence is determined based on a frequency-domain subcarrier spacing corresponding to a portion or the entirety of the partial time-domain signal, or the length of the modulation signal, wherein the initial phase of the frequency shift sequence is an arbitrary value.

Optionally, the provided preamble symbol generation method further comprise such features: the preamble symbol transmits signalling information in the following ways: on the premise of giving a combination of the length of the cyclic prefix and the length of the modulation signal, in generating the modulation signal, the partial time-domain main body signal needs to be truncated, and the transmission of different pieces of signalling information are realized by different start positions of truncation.

Optionally, the provided preamble symbol generation method further comprise such features: the length of the time-domain main body signal is 2048 sampling periods; the length of the cyclic prefix is 520 sampling periods; the length of the modulation signal is 504 sampling periods; and the start position of truncating the modulation signal in the time-domain main body signal is the 1544th sample.

Optionally, the provided preamble symbol generation method further comprise such features: assuming that P1_A(t) is the time-domain expression of the time-domain symbol, and $N_A$ is the length of the time-domain signal, and assuming that $Len_C$ the length of the cyclic prefix, $Len_B$ is the length of the modulation signal, $f_{SH}$ is the modulation frequency offset value for modulating the time-domain main body signal, and T is a sampling period, then the time-domain expression of the time-domain symbol of the preamble symbol containing the cyclic prefix, the time-domain main body signal and the modulation signal is:

$$P_{C-A-B}(t) = \begin{cases} P1\_A(t + (N_A - Len_C)T) & 0 \le t < Len_C T \\ P1\_A(t - Len_C T) & Len_C T \le t < (N_A + Len_C)T \\ P1\_A & (N_A + Len_C)T \le t < \\ (t - (Len_C + N_A - N1)T)e^{j2\pi f_{SH} t} & (N_A + Len_C + Len_B)T \\ 0 & \text{otherwise} \end{cases}$$

Optionally, the provided preamble symbol generation method further comprise such features: the length of the time-domain main body signal $N_A$ is 2048, the length of the cyclic prefix $Len_C$ is 520, and the length of the modulation signal $Len_B$ is 504, then the time-domain expression of the time-domain symbol of the preamble symbol containing the cyclic prefix, the time-domain main body signal and the modulation signal is:

$$P_{C-A-B}(t) = \begin{cases} P1\_A(t + 1528T) & 0 \le t < 520T \\ P1\_A(t - 520T) & 520T \le t < 2568T \\ P1\_A(t - 1024T)e^{j2\pi f_{SH} t} & 2568T \le t < 3072T \\ 0 & \text{otherwise} \end{cases}$$

$$f_{SH} = 1/(2048)T.$$

Optionally, the provided preamble symbol generation method further comprise such features: the time-domain main body signal bears an emergency broadcast identifier using at least one bit of signalling, and when the modulation signal with the modulation signal length is truncated in the time-domain main body signal according to different start positions, the different start positions can bear the emergency broadcast identifier.

Optionally, the provided preamble symbol generation method further comprise such features: the time-domain main body signal is obtained by processing a frequency-domain symbol.

Optionally, the provided preamble symbol generation method further comprise such features: the step of generating the frequency-domain symbol contains: arranging a fixed sequence and a signalling sequence respectively generated in the frequency domain and filling valid subcarriers with the arranged fixed sequence and signalling sequence.

Method II

Furthermore, the embodiments of the present invention also provide a frequency-domain symbol generation method, characterizing by comprising the following steps: arranging a fixed sequence and a signalling sequence respectively generated in the frequency domain and filling valid subcarriers with the arranged fixed sequence and signalling sequence, for forming the frequency-domain symbol with a predefined length.

Optionally, the provided frequency-domain symbol generation method further comprise such features: the method further comprises: determining an average power ratio of the fixed sequence to the signalling sequence, and respectively generating the fixed sequence and the signalling sequence according to the average power ratio.

Optionally, the provided frequency-domain symbol generation method further comprise such features: the value of the average power ratio of the fixed sequence to the signalling sequence is taken to be 2.

Optionally, the provided frequency-domain symbol generation method further comprise such features: arranging the fixed sequence and the signalling sequence in a predefined interlaced arrangement rule, wherein the predefined interlaced arrangement rule contains either of the following two rules: arranging in an odd-even interlaced or even-odd interlaced mode; or placing a part of the signalling sequence on odd-numbered subcarriers, then placing the other part of the signalling sequence on even-numbered subcarriers; and placing a portion of the fixed sequence on odd-numbered subcarriers, then placing the other part of the fixed sequence on odd-numbered subcarriers.

Optionally, the provided frequency-domain symbol generation method further comprise such features: the step of generating the signalling sequence comprises: generating the same sequence generation formula based on a pre-set length and number of the signalling sequence; based on the same sequence generation formula, choosing different phase base values to produce different constant amplitude zero auto-correlation sequences; and selecting the signalling sequence according to the determined signalling sequence length from each of the obtained constant amplitude zero auto-correlation sequences.

Optionally, the provided frequency-domain symbol generation method further comprise such features: the step of generating the signalling sequence comprises: determining several sequence generation formulas based on a pre-set length and number of the signalling sequence; for each of the sequence generation formulas, choosing different phase base values to correspondingly produce a constant amplitude zero auto-correlation sequence; and selecting the signalling sequence according to the determined signalling sequence length from each of the obtained constant amplitude zero auto-correlation sequences.

Optionally, the provided frequency-domain symbol generation method further comprise such features: for the produced constant amplitude zero auto-correlation sequences, the method further comprises the following step: further cyclically shifting the produced constant amplitude zero auto-correlation sequences.

Method III

Furthermore, the embodiments of the present invention also provide a preamble symbol receiving method, characterizing by comprising the following steps: processing a received signal; judging whether the processed signal contains a preamble symbol desired to be received; and when a judgement result is yes, determining the position of the preamble symbol and resolving signalling information carried by the preamble symbol.

Optionally, the provided preamble symbol receiving method further comprise such features: the steps of judging whether the processed signal contains the preamble symbol desired to be received, and when a judgement result is yes, determining the position of the preamble symbol and solving signalling information carried by the preamble symbol contain at least one of the following: initial timing synchronization, an integral multiple of frequency offset estimation, fine timing synchronization, channel estimation, decoding and analysis and fractional frequency offset estimation.

Optionally, the provided preamble symbol receiving method further comprise such features: whether the processed signal contains the preamble symbol desired to be received is judged using a result of at least any one of the following: initial timing synchronization, an integral multiple of frequency offset estimation, fine timing synchronization, channel estimation, decoding and analysis and fractional frequency offset estimation.

Optionally, the provided preamble symbol receiving method further comprise such features: the steps of judging whether the processed signal contains the preamble symbol desired to be received include the following steps: preliminarily determining the position of the preamble symbol by means of initial timing synchronization; and based on a result of the initial timing synchronization, judging whether the processed signal contains the preamble symbol desired to be received.

Optionally, the provided preamble symbol receiving method further comprise such features: the initial timing synchronization contains: first initial timing synchronization: conducting necessary inverse processing and/or signalling demodulation on the processed received signal using an association relationship between any two of the three, i.e. the cyclic prefix, the time-domain main body signal and the modulation signal, and performing delayed moving auto-correlation to acquire an accumulation correlation value; and performing delay relationship match and/or a specific mathematical calculation based on the accumulation correlation value, and using a processed value obtained for the initial timing synchronization, so as to preliminarily determine the position of the preamble symbol, or second initial timing synchronization: when any the time-domain main body signal in the preamble symbol contains a known signal, conducting a differential operation on the time-domain main body signal according to N predefined differential values, and also conducting an differential operation on time-domain signal corresponding to the known information, then correlating the two to obtain N differential correlation results corresponding the N differential values on an one to one basis, and performing preliminary synchronization based on the N differential correlation results to obtain processed value, for preliminarily determining the position of the preamble symbol, with $N \geq 1$, wherein when the judgement is completed based on the first initial timing synchronization and the second initial timing synchronization, weighting the respectively obtained processed values, and completing initial timing synchronization using the weighted arithmetic value.

Optionally, the provided preamble symbol receiving method further comprise such features: the step of determining the position of the preamble symbol and solving signalling information carried by the preamble symbol contains: solving the signalling information carried by the preamble symbol using all or some time-domain signals of the preamble symbol and/or frequency-domain signals obtained by transforming all or some time-domain signals of the preamble symbol.

Optionally, the provided preamble symbol receiving method further comprise such features: when the generation of the received frequency-domain symbol for generating the preamble symbol contains the step of respectively arranging a fixed sequence and a signalling sequence and filling valid subcarriers with the arranged fixed sequence and signalling sequence, the method further comprises: conducting an integral multiple of frequency offset estimation or channel estimation using the fixed sequence, and the step of conducting an integral multiple of frequency offset estimation or channel estimation using the fixed sequence comprises: according to the position of the preliminarily determined preamble symbol, truncating a signal containing all or some of fixed subcarriers; conducting an calculation on the signal containing all or some of the fixed subcarriers with a frequency-domain fixed subcarrier sequence, so as to realize an integral multiple of frequency offset estimation or channel estimation; alternatively, conducting an calculation on a time-domain signal corresponding to the frequency-domain fixed subcarrier sequence to realize an integral multiple of frequency offset estimation or channel estimation.

Device I

Additionally, the embodiments of the present invention also provide a preamble symbol generation device, characterized by comprising: a cyclic prefix generation unit for generating a cyclic prefix according to a partial time-domain main body signal truncated from a time-domain main body signal; a modulation signal generation unit for generating a modulation signal based on a portion or the entirety of the partial time-domain main body signal; and a preamble symbol generation unit for generating a time-domain symbol based on at least one of the cyclic prefix, the time-domain main body signal and the modulation signal, wherein the preamble symbol contains at least one the time-domain symbol.

Device II

Additionally, the embodiments of the present invention also provide a frequency-domain symbol generation device, characterized by comprising: a sequence generation unit for generating a fixed sequence and a signalling sequence respectively in the frequency domain; and a frequency-domain symbol generation unit for arranging the fixed sequence and the signalling sequence and filling valid subcarriers with the arranged fixed sequence and signalling sequence, for forming the frequency-domain symbol with a predefined length.

Device III

Furthermore, the embodiments of the present invention also provide a preamble symbol receiving device, characterizing by comprising: a receiving and processing unit for processing a received signal; a judgement unit for judging whether the processed signal contains a preamble symbol desired to be received; and a position parsing unit for, when a judgement result is yes, determining the position of the preamble symbol and solving signalling information carried by the preamble symbol.

Compared with the prior art, the technical solutions of the present invention have the following beneficial effects:

In the preamble symbol generation method and receiving method, and a relevant frequency-domain symbol generation method and relevant device provided according to the embodiments of the present invention, When a time-domain main body signal is an OFDM symbol, using the entirety or a portion with a certain length of the time-domain main body signal as a prefix, coherent detection can be realized using the generated prefix, thus solving the problems of performance degradation in non-coherent detection and a DBPSK differential decoding failure under a complex frequency-selective fading channel; and generating a modulation signal using the truncated entirety or a portion of the time-domain main body signal with the length of the cyclic prefix enables the generated preamble symbol to have sound fractional frequency offset estimation performance and timing synchronization performance.

Further, it can be chosen to send a time-domain symbol with a three-segment structure as a preamble symbol according to the requirements of transmission efficiency and robustness. When the preamble symbol contains a time-domain symbol with a three-segment structure, based on the same OFDM symbol main body, a different start points of truncation when truncating the second part from the first part can be used for transmitting signalling, such as emergency broadcast, hook information, transmitter sign information or other transmission parameters.

DETAILED DESCRIPTION OF THE DRAWINGS

Generation Method

Figure 9:
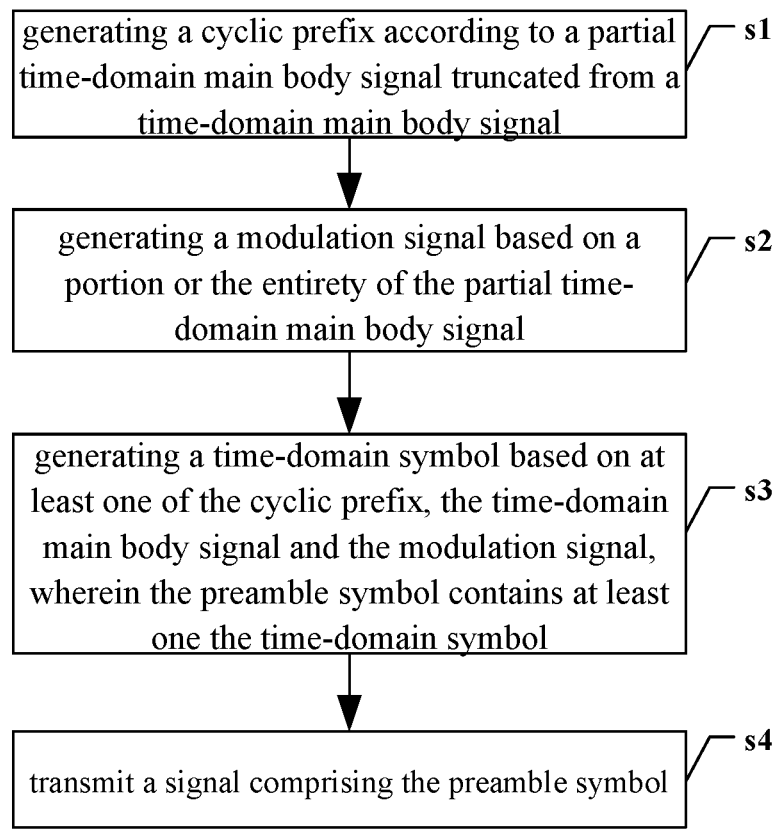
FIG. 9 is a flowchart showing a preamble symbol generation method according to one aspect of the present invention.

This embodiment provides a preamble symbol generation method, as shown in FIG. 9. The preamble symbol generation method comprises the following steps:

s1: generating a cyclic prefix according to a partial time-domain main body signal truncated from a time-domain main body signal;

s2: generating a modulation signal based on a portion or the entirety of the partial time-domain main body signal; and s3: generating a time-domain symbol based on at least one of the cyclic prefix, the time-domain main body signal and the modulation signal, wherein the preamble symbol contains at least one the time-domain symbol.

Figure 1:
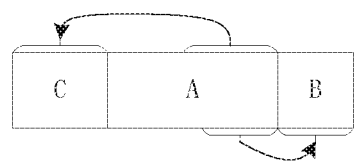
FIG. 1 is a schematic diagram of a time-domain symbol with a first three-segment structure in the embodiments of the present invention.
Figure 2:
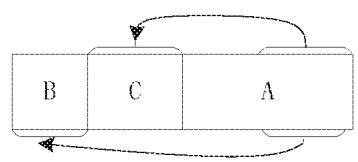
FIG. 2 is a schematic diagram of a time-domain symbol with a second three-segment structure in the embodiments of the present invention.

FIG. 1 is a schematic diagram of a time-domain symbol with a first three-segment structure in the embodiments of the present invention. FIG. 2 is a schematic diagram of a time-domain symbol with a second three-segment structure in the embodiments of the present invention.

The generated preamble symbol comprises:

a time-domain symbol with a first three-segment structure; or a time-domain symbol with a second three-segment structure.

The following description is made to a time-domain structure of the time-domain symbols contained in the above-mentioned preamble symbol through FIG. 1 and FIG. 2. The time-domain structure contains a three-segment structure; and the three-segment have two alternatives, i.e. a first three-segment structure and a second three-segment structure.

As shown in FIG. 1, the first three-segment structure is: a time-domain main body signal (part A), a prefix (part C) generated by utilizing to a partial time-domain main body signal which is truncated from the time-domain main body signal, and a modulation signal, i.e. a postfix (part B), which is generated by utilizing a portion or the entirety of the partial time-domain main body signal.

As shown in FIG. 2, the second three-segment structure is: a time-domain main body signal (part A), a prefix (part C) generated by utilizing to a partial time-domain main body signal which is truncated from the time-domain main body signal, and a modulation signal, i.e. a hyper prefix (part B), which is generated by utilizing the partial time-domain main body signal.

Specifically, a section of a time-domain main body signal (indicated by A in the figure) is taken as a first part, a first portion is taken from the end of the first part according to a predefined acquisition rule, and is processed according to a first predefined processing rule and replicated to the front of the first part to produce a third part (indicated by C in the figure), thus taking it as a prefix; at the same time, a portion is taken from the rear of the first part according to a predefined acquisition rule, and is processed according to a second predefined processing rule and replicated to the rear of the first part or processed and replicated to the front of the prefix to produce a second part (indicated by B in the figure), thus respectively taking it as a postfix or a hyper prefix correspondingly, thereby respectively producing the first three-segment structure with B as the postfix as shown in FIG. 1 (CAB structure) and the second three-segment structure with B as the hyper prefix as shown in FIG. 2 (BCA structure).

With regard to the particular rules for processing the third part and the second part from the first part, the first predefined processing rule comprises: direct copy, or multiplying each sampling signal in the taken part by a fixed coefficient or a predefined variable coefficient. The second predefined processing rule comprises: conducting modulation when the first predefined processing rule is direct copy, or when the first predefined processing rule is multiplying each sampling signal in the taken part by a fixed coefficient or predefined variable coefficient, multiplying a corresponding part by the corresponding coefficient as well and then conducting modulation processing. That is, when the third part is the prefix obtained through directly copy, modulation processing is performed on the second part as the postfix or hyper prefix by a corresponding main body part; and when the third part is multiplied by a corresponding coefficient, the second part also needs to be multiplied by a coefficient for modulation processing, and is then taken as the postfix or hyper prefix.

Figure 3:
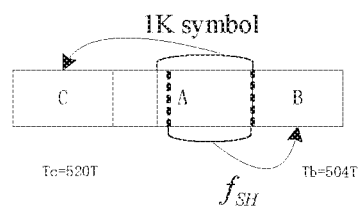
FIG. 3 is a schematic diagram of acquisition processing based on a time-domain symbol with the first three-segment structure in the embodiments of the present invention.

FIG. 3 is a schematic diagram of the acquisition processing of a time-domain symbol with a first three-segment structure in the embodiments of the present invention.

In this embodiment, section C is directly copied from section A, and section B is a modulation signal section of section A. As shown in FIG. 3, for example, the length of A is 1024, the length of C truncated is 520, and the length of B is 504, wherein when processing C and B, each sample of the signal can be multiplied with a fixed coefficient, or each sample is multiplied by a different coefficient.

The data range of B does not exceed the data range of C, which means that the range in A which is selected for the modulation signal section B would not exceed the range in A for as the prefix C. Preferably, the sum of the length of B and that of C is the length of A.

Let $N_A$ denotes the length of A, $Len_C$ denotes the length of C, and $Len_B$ denotes the length of the modulation signal section B. Let the sampling point serial numbers of A be 0, 1, ... $N_A$−1 Let the first sampling point serial number for generating the modulation signal section part B in A be N1, and the final sampling point serial number for generating the modulation signal section part B in A is N2. The first sampling point serial number and the second sampling point serial number satisfy the following predefined restriction relationship:

$$N2 = N1 + Len_B - 1 \quad \text{(Formula 1)}$$

Generally, modulation made on the second part B section is frequency offset modulation, i.e. multiplying a frequency shift sequence, a modulation (M) sequence or other sequences, etc. The modulation frequency offset is taken as an example in this embodiment, assuming that P1_A(t) is the time-domain expression of A, then the time-domain expression of the first C-A-B three-segment structure is $$P_{C-A-B}(t) = \quad \text{(Formula 2)}$$

$$\begin{cases} P1\_A(t + (N_A - Len_C)T) & 0 \le t < Len_C T \\ P1\_A(t - Len_C T) & Len_C T \le t < (N_A + Len_C)T \\ P1\_A \\ (t - (Len_C + N_A - N1)T) & (N_A + Len_C)T \le t < \\ e^{j2\pi f_{SH} t} & (N_A + Len_C + Len_B)T \\ 0 & \text{otherwise} \end{cases}$$

where if the time-domain main body signal is an OFDM symbol, the modulation frequency offset value $f_{SH}$ can be selected as a frequency-domain subcarrier interval i.e. $1/N_A T$ corresponding to a time-domain OFDM main-body signal, with T being the sampling period, $N_A$ being the length of the time-domain OFDM main-body signal. In this example, $N_A$ is 1024, and $f_{SH}=1/1024T$ The primary phase of the frequency shift sequence; and in order to enable a correlationpeak to be sharp, $f_{SH}$ can also be selected as $1/(Len_B T)$ As shown in FIG. 3, $N_A$1024; $Len_C$=520, $Len_B$=504, N1=520. At this moment, the auto-correlation delay of section CA containing the same content is $N_A$, the auto-correlation delay of section CB containing the same content is $N_A+Len_B$, and the auto-correlation delay of section AB containing the same content is $Len_B$.

In another embodiment, the length of section C is the same as that of section B, that is to say, section B can be considered as a completely frequency offset adjustment of section C.

Particularly, the cyclic prefix C is assembled at the front of the time-domain OFDM symbol A as a guard interval, and the modulation signal section B is assembled at the rear of the OFDM symbol as a modulation frequency offset sequence, so as to generate a time-domain symbol with the first three-segment structure. For example, when $N_A$=1024, the particular expression can be as follows, $$P_{C-A-B}(t) = \quad \text{(Formula 3)}$$

$$\begin{cases} P1\_A(t + (1024 - Len_C)T) & 0 \le t < Len_C T \\ P1\_A(t - Len_C T) & Len_C T \le t < (1024 + Len_C)T \\ P1\_A(t - 2Len_C T)e^{j2\pi f_{SH} t} & (1024 + Len_C)T \le t < \\ & (1024 + 2Len_C)T \\ 0 & \text{otherwise} \end{cases}$$

Figure 4:
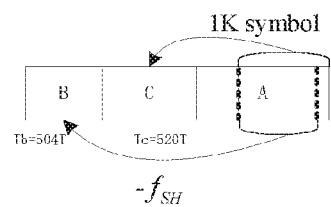
FIG. 4 is a schematic diagram of acquisition processing based on a time-domain symbol with the second three-segment structure in the embodiments of the present invention.

FIG. 4 is a schematic diagram of the processing of a time-domain symbol with a second three-segment structure in the embodiments of the present invention.

In a similar way, the time-domain expression of the time-domain symbol with the second three-segment structure is as follows. Note that in order to enable the processing method of the receiving end as consistent as possible, in the B-C-A structure, the modulation frequency offset value is exactly contrary to the C-A-B structure, and the primary phase of the modulation frequency offset sequence is an arbitrary value.

$$P_{B-C-A}(t) = \begin{cases} P1\_A(t+(N1)T)e^{-j2\pi f_{SH}(t-Len_CT)} & 0 \le t < Len_BT \\ P1\_A(t-(Len_B-N_A+Len_C)T) & Len_BT \le t < (Len_B+Len_C)T \\ P1\_A(t-(Len_B+Len_C)T) & (Len_B+Len_C)T \le t < (Len_B+Len_C+N_A)T \\ 0 & \text{otherwise} \end{cases} \quad \text{(Formula 4)}$$

As shown in FIG. 4, $N_A$1024; $Len_C$=520, $Len_B$=504, N1=520. At this moment, the auto-correlation delay of section CA containing the same content is $N_A$, the auto-correlation delay of section BC containing the same content is $Len_B$, and the auto-correlation delay of section BA containing the same content is $N_A$+$Len_B$.

Further, when the preamble symbol contains a symbol with a three-segment structure, no matter the three-segment structure is the first three-segment structure or the second three-segment structure, based on the same OFDM symbol main body, signalling can also be transmitted using a time-domain structure in the following way.

Different start points of selecting the second part from the first part are used for transmitting signalling, that is, when generating the modulation signal, the transmission of different pieces of signalling information is realized by truncating the partial time-domain symbol at different start positions.

Such as emergency broadcast, hook information, transmitter sign information or other transmission parameters.

By way of example, for the first three-segment structure, for example, the predefined length is 1024, $Len_C$ is 512, and $Len_B$ is 256.

N1 can be valued 512+i*16 0≤i<16, which can then indicate 16 different mode to take by second part, and transmit 4 bits of signalling parameters. Different transmitters can transmit an identifier corresponding to the transmitter by taking different N1, the same transmitter can also transmit a parameter by changing N1 in a time-division manner.

For another example, 1 bit of signalling is used for transmitting emergency broadcast identifier EAS_flag.

if EAS_flag=1, then N1=512+L, that is, taking sampling points from serial numbers 512−L to 1023−2L of OFDM symbol with $N_A$ being 1024 and perform modulation by the frequency offset sequence to generate B, and placing it at the rear of A.

if EAS_flag=0, then N1=512+L that is, taking sampling points with serial numbers 512+L to 1023 of OFDM symbol with $N_A$ being 1024 and perform modulation by the frequency offset sequence to generate B, and placing it at the rear of A.

The value of L is 8.

Particularly, $N_A$=1024, $Len_C$ is 520, $Len_B$ is 504; N1=520 indicates that EAS_flag=0, and N1=504 indicates that EAS_flag=1; or N1=504 indicates that EAS_flag=0, and N1=520 indicates that EAS_flag=1.

For another example, $N_A$=2048, $Len_C$ is 520, $Len_B$ is 504; N1=1544 indicates that EAS_flag=0, and N1=1528 indicates that EAS_flag=1; or N1=1528 indicates that EAS_flag=0, and N1=1544 indicates that EAS_flag=1.

For specific expressions, when EAS_flag=0, the time-domain expression of the C-A-B three-segment structure is:

$$P_{C-A-B}(t) = \begin{cases} P1\_A(t+504T) & 0 \le t < 520T \\ P1\_A(t-520T) & 520T \le t < 1544T \\ P1\_A(t-1024T)e^{j2\pi f_{SH}t} & 1544T \le t < 2048T \\ 0 & \text{otherwise} \end{cases}$$

when $(N_A = 1024)$ $$P_{C-A-B}(t) = \begin{cases} P1\_A(t+1528T) & 0 \le t < 520T \\ P1\_A(t-520T) & 520T \le t < 2568T \\ P1\_A(t-1024T)e^{j2\pi f_{SH}t} & 2568T \le t < 3072T \\ 0 & \text{otherwise} \end{cases}$$

when $(N_A = 2048)$ and when EAS_flag=1, the time-domain expression of the C-A-B three-segment structure is:

$$P_{C-A-B}(t) = \begin{cases} P1\_A(t+504T) & 0 \le t < 520T \\ P1\_A(t-520T) & 520T \le t < 1544T \\ P1\_A(t-1040T)e^{j2\pi f_{SH}t} & 1544T \le t < 2048T \\ 0 & \text{otherwise} \end{cases}$$

when $(N_A = 1024)$ $$P_{C-A-B}(t) = \begin{cases} P1\_A(t+1528T) & 0 \le t < 520T \\ P1\_A(t-520T) & 520T \le t < 2568T \\ P1\_A(t-1040T)e^{j2\pi f_{SH}t} & 2568T \le t < 3072T \\ 0 & \text{otherwise} \end{cases}$$

when $(N_A = 2048)$ and

Besides truncating the second part from the first part at different start points to indicate emergency broadcast, when the preamble symbol contains only one three-segment structure, a variable three-segment structure can be used to identify emergency broadcast. For example, EAS_flag=0 can be indicated by sending the first three-segment structure C-A-B, and EAS_flag=1 is indicated by sending the second three-segment structure B-C-A; alternatively, EAS_flag=1 is indicated by sending the first three-segment structure C-A-B, and EAS_flag=0 is indicated by sending the second three-segment structure B-C-A.

A peak is acquired by means of the delayed auto-correlation of section CB, section CA and section BA when detecting a single time-domain symbol with a three-segment structure; when assembling two time-domain symbols with a three-segment structure, in order to be able to add the auto-correlation value of the two time-domain symbols with a three-segment structure and obtain more robust performance, the parameter N1 of each of the two time-domain symbols with a three-segment structure (that is, N1 is the sampling point serial number in A corresponding to the start point chosen to be replicated for modulation signal segment B) should satisfy a certain relationship, assuming that N1 of the first symbol is N1_1, and N1 of the second symbol is N1_2, then they should satisfy N1_1+N1_2=2$N_A$−($Len_B$+

Len$_C$). Moreover, if the modulation performed on segment B is modulation frequency offset, the frequency offset value is exactly contrary.

Serial number 1 is used to indicate the symbol with the C-A-B structure, and serial number 2 is used to indicate the symbol with the B-C-A structure. Assuming that P1_A(t) is the time-domain expression of A1, and P2_A(t) is the time-domain expression of A2, then the time-domain expression of a time-domain symbol with the first three-segment structure is:

$$P_{C-A-B}(t) = \begin{cases} P1\_A(t + (N_A - Len_C)T) & 0 \le t < Len_C T \\ P1\_A(t - Len_C T) & Len_C T \le t < (N_A + Len_C)T \\ P1\_A \\ (t - (Len_C + N_A - N1\_1)T) & (N_A + Len_C)T \le t < \\ e^{j2\pi f_{SH} t} & (N_A + Len_C + Len_B)T \\ 0 & \text{otherwise} \end{cases}$$ (Formula 5)

By way of example: $N_A$=2048; Len$_C$, =520; Len$_B$=504; $f_{SH}$=1/2048T.

$$P_{C-A-B}(t) = \begin{cases} P1\_A(t + 504T) & 0 \le t < 520T \\ P1\_A(t - 520T) & 520T \le t < 1544T \\ P1\_A(t - 1024T)e^{j2\pi f_{SH} t} & 1544T \le t < 2048T \\ 0 & \text{otherwise} \end{cases}$$

and then the time-domain expression of a time-domain symbol with the second three-segment structure is:

$$P_{B-C-A}(t) = \qquad \text{(Formula 6)}$$
$$\begin{cases} P2\_A(t + (N1\_2)T) \\ e^{-j2\pi f_{SH}(t-len_C T)} & 0 \le t < Len_B T \\ P2\_A(t - (Len_B - N_A + \\ Len_C)T) & Len_B T \le t < (Len_B + Len_C)T \\ P2\_A(t - (Len_B + Len_C)T) & (Len_B + Len_C)T \le t < \\ & (Len_B + Len_C + N_A)T \\ 0 & \text{otherwise} \end{cases}$$

Still with respect to the above example, $N_A$=2048; and Len$_C$=520, Len$_B$=504, and $f_{SH}$=1/2048T $$P_{B-C-A}(t) = \begin{cases} P2\_A(t + 1528T)e^{-j2\pi f_{SH}(t-520T)} & 0 \le t < 504T \\ P2\_A(t + 1024T) & 504T \le t < 1024T \\ P2\_A(t - 1024T) & 1024T \le t < 3072T \\ 0 & \text{otherwise} \end{cases}$$

The preamble symbol (preamble) or bootstrap introduced above contains not only: a time-domain symbol with a first three-segment structure; or a time-domain symbol with a second three-segment structure It should be specially noted that the preamble symbol of bootstrap in the present invention is not limited to only containing a C-A-B or B-C-A structure, but can also contain other time-domain structures, such as a traditional CP structure.

The present invention also provides a frequency-domain symbol generation method, and description is made below to a method for generating a frequency-domain OFDM symbol with the following frequency-domain structure I.

Furthermore, it can be seen in combination with the three-segment time-domain structure above that a fixed corresponding relationship exists between the time domain and the frequency domain. In a general case, a time-domain main body signal (part A) is a time-domain OFDM symbol formed from a frequency-domain OFDM symbol after inverse Fourier transform. However, it should be noted that the frequency-domain symbol generation method provided in the present invention is not limited to be used in a symbol in which the three-segment structure as shown in FIG. 1 to FIG. 7 above is adopted in terms of the time domain, but can also be applied to other symbols with an arbitrary time-domain structure.

It is assumed that P1_X is a corresponding frequency-domain OFDM symbol, and inverse discrete Fourier transform is performed on P1_X$_i$ to obtain a time-domain OFDM symbol:

$$P1\_A(t) = \frac{1}{\sqrt{M}} \sum_{m=0}^{N_{FFT}} P1\_X(m) e^{j2\pi \frac{(m-N_{FFT}/2)}{N_{FFT} T} t}, \qquad \text{(Formula 7)}$$

where M is the sum of the power for valid non-zero subcarriers.

In the present invention, the frequency-domain structures of two different types of P1_X are elaborated.

[Frequency-domain Structure I]

First of all, the frequency-domain structure of the first type of P1_X is elaborated, and is defined as frequency-domain structure I. For frequency-domain structure I, the frequency-domain symbol generation method comprises the following steps:

respectively generating a fixed sequence and a signalling sequence on the frequency domain; and arranging the fixed sequence and the signalling sequence and filling valid subcarriers with the arranged fixed sequence and signalling sequence, for forming a frequency-domain symbol.

For frequency-domain structure I of P1_X, the frequency-domain OFDM symbol respectively comprises three parts, i.e. virtual subcarriers, signalling sequence (referred to as SC) subcarriers and fixed sequence (referred to as FC) subcarriers.

After arranging signalling sequence subcarriers and fixed sequence subcarriers according to a predefined interlaced arrangement rule, the virtual subcarriers are distributed at two sides of them. The predefined interlaced arrangement rule comprises either one of the following two rules:

a first predefined interlaced arrangement rule: arrangement in an odd-even interlaced manner or an even-odd interlaced manner; and a second predefined interlaced arrangement rule: placing a portion of the signalling sequence on odd-numbered subcarriers, and the other portion of the signalling sequence on even-numbered subcarriers; and placing a portion of the fixed sequence on the odd-numbered subcarriers, and the other portion of the fixed sequence on the even-numbered subcarriers.

The first predefined interlaced arrangement rule is to arrange the SC and the FC in an odd-even interlaced pattern or an even-odd interlaced pattern, in this way, the FC is arranged according to a pilor rule. In the second predefined interlaced arrangement rule, a part of the SC sequence needs to be put on odd-numbered subcarriers, and the remaining SC sequence is put on even-numbered subcarriers; and a part of the FC sequence needs to be put on odd-numbered subcarriers, and the remaining FC sequence is put on even-numbered subcarriers; in this way, the case where the entire FC or SC is put on odd-numbered or even-numbered subcarriers and would entirely fade under some special multi-path is avoided, and this arrangement would not increase the complexity of channel estimation, and is thus a better choice.

Let the length of the fixed sequence be L (that is, the number of valid subcarriers bearing the fixed sequence is L), and the length of the signalling sequence be P (that is, the number of valid subcarriers bearing the signalling sequence is P). In this embodiment, L=P. It should be noted that when the length of the fixed sequence is not consistent with that of the signalling sequence (e.g. P>L), the interlaced arrangement of the fixed sequence and the signalling sequence according to the above-mentioned rule can be realized by means of filling subcarriers with zero sequence.

Figure 5:
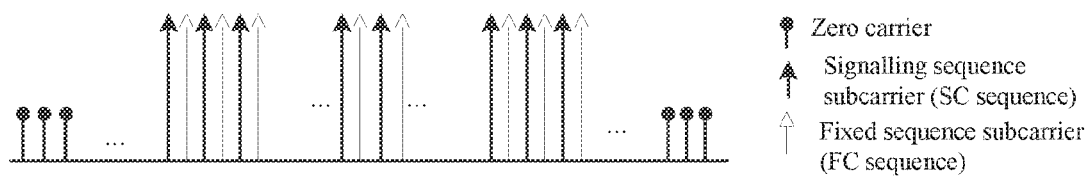
FIG. 5 is a schematic diagram of frequency-domain structure I arranged according to a first predetermined interlaced arrangement rule in the embodiments of the present invention.

FIG. 5 is a schematic diagram of the signalling sequence subcarriers, the fixed sequence subcarriers and the virtual subcarriers arranged according to a first predetermined interlaced arrangement rule in the embodiments of the present invention.

As shown in FIG. 5, in this preferred implementation, the step comprises: respectively filling subcarriers with certain zero sequence at two sides of the valid subcarriers, to form a frequency-domain OFDM symbol with a predefined length.

Corresponding to the fact that the length $N_A$ of the time-domain main body signal A in the above-mentioned time-domain structure is 1024, the length of frequency-domain signal $N_{FFT}$ formed by performing fast Fourier transform (FFT) is 1024.

The example of the predefined length of $N_{FFT}$ being 1024 is continued to be used below, the length of the zero sequence subcarriers is G=1024-L-P, and (1024-L-P)/2 zero sequence are used to fill subcarriers at two sides thereof. For example, L=P=353, then G=318, 159 zero sequence subcarriers are respectively filled at two sides.

Generating the frequency-domain OFDM symbol according to the first predefined interlaced arrangement rule comprises the following step:

The (11)th fixed sequence generation step: the fixed sequence is composed of 353 complex numbers, the modulus thereof is constant, and the nth value of the fixed sequence subcarriers is expressed as:

$$FC(n)=\sqrt{R}e^{j\omega_n}, n=0\sim352 \quad \text{(Formula 8)}$$

where R is the power ratio of F C to S C, and the modulus $SC_i$ is constant 1

$$R = \frac{\sum_n |FC(n)|^2}{\sum_n |SC(n)|^2} \quad \text{(Formula 9)}$$

The radian value of $\omega_n$; the fixed sequence subcarriers is determined through the first predefined fixed subcarrier radian values in table 1;

TABLE 1

First predefined fixed subcarrier radian value table
(first predefined interlaced arrangement rule)

| | | | | | | | | | |
|---|---|---|---|---|---|---|---|---|---|
| 5.43 | 2.56 | 0.71 | 0.06 | 2.72 | 0.77 | 1.49 | 6.06 | 4.82 | 2.10 |
| 5.62 | 4.96 | 4.93 | 4.84 | 4.67 | 5.86 | 5.74 | 3.54 | 2.50 | 3.75 |
| 0.86 | 1.44 | 3.83 | 4.08 | 5.83 | 1.47 | 0.77 | 1.29 | 0.16 | 1.38 |
| 4.38 | 2.52 | 3.42 | 3.46 | 4.39 | 0.61 | 4.02 | 1.26 | 2.93 | 3.84 |
| 3.81 | 6.21 | 3.80 | 0.69 | 5.80 | 4.28 | 1.73 | 3.34 | 3.08 | 5.85 |
| 1.39 | 0.25 | 1.28 | 5.14 | 5.54 | 2.38 | 6.20 | 3.05 | 4.37 | 5.41 |
| 2.23 | 0.49 | 5.12 | 6.26 | 3.00 | 2.60 | 3.89 | 5.47 | 4.83 | 4.17 |
| 3.36 | 2.63 | 3.94 | 5.13 | 3.71 | 5.89 | 0.94 | 1.38 | 1.88 | 0.13 |
| 0.27 | 4.90 | 4.89 | 5.50 | 3.02 | 1.94 | 2.93 | 6.12 | 5.47 | 6.04 |
| 1.14 | 5.52 | 2.01 | 1.08 | 2.79 | 0.74 | 2.30 | 0.85 | 0.58 | 2.25 |
| 5.25 | 0.23 | 6.01 | 2.66 | 2.48 | 2.79 | 4.06 | 1.09 | 2.48 | 2.39 |
| 5.39 | 0.61 | 6.25 | 2.62 | 5.36 | 3.10 | 1.56 | 0.91 | 0.08 | 2.52 |
| 5.53 | 3.62 | 2.90 | 5.64 | 3.18 | 2.36 | 2.08 | 6.00 | 2.69 | 1.35 |
| 5.39 | 3.54 | 2.01 | 4.88 | 3.08 | 0.76 | 2.13 | 3.26 | 2.28 | 1.32 |
| 5.00 | 3.74 | 1.82 | 5.78 | 2.28 | 2.44 | 4.57 | 1.48 | 2.48 | 1.52 |
| 2.70 | 5.61 | 3.06 | 1.07 | 4.54 | 4.10 | 0.09 | 2.11 | 0.10 | 3.18 |
| 3.42 | 2.10 | 3.50 | 4.65 | 2.18 | 1.77 | 4.72 | 5.71 | 1.48 | 2.50 |
| 4.89 | 4.04 | 6.12 | 4.28 | 1.08 | 2.90 | 0.24 | 4.02 | 1.29 | 3.61 |
| 4.36 | 6.00 | 2.45 | 5.49 | 1.02 | 0.85 | 5.58 | 2.43 | 0.83 | 0.65 |
| 1.95 | 0.79 | 5.45 | 1.94 | 0.31 | 0.12 | 3.25 | 3.75 | 2.35 | 0.73 |
| 0.20 | 6.05 | 2.98 | 4.70 | 0.69 | 5.97 | 0.92 | 2.65 | 4.17 | 5.71 |
| 1.54 | 2.84 | 0.98 | 1.47 | 6.18 | 4.52 | 4.44 | 0.44 | 1.62 | 6.09 |
| 5.86 | 2.74 | 3.27 | 3.28 | 0.55 | 5.46 | 0.24 | 5.12 | 3.09 | 4.66 |
| 4.78 | 0.39 | 1.63 | 1.20 | 5.26 | 0.92 | 5.98 | 0.78 | 1.79 | 0.75 |
| 4.45 | 1.41 | 2.56 | 2.55 | 1.79 | 2.54 | 5.88 | 1.52 | 5.04 | 1.53 |
| 5.53 | 5.93 | 5.36 | 5.17 | 0.99 | 2.07 | 3.57 | 3.67 | 2.61 | 1.72 |
| 2.83 | 0.86 | 3.16 | 0.55 | 5.99 | 2.06 | 1.90 | 0.60 | 0.05 | 4.01 |
| 6.15 | 0.10 | 0.26 | 2.89 | 3.12 | 3.14 | 0.11 | 0.11 | 3.97 | 5.15 |
| 4.38 | 2.08 | 1.27 | 1.17 | 0.42 | 3.47 | 3.86 | 2.17 | 5.07 | 5.33 |
| 2.63 | 3.20 | 3.39 | 3.21 | 4.58 | 4.66 | 2.69 | 4.67 | 2.35 | 2.44 |
| 0.46 | 4.26 | 3.63 | 2.62 | 3.35 | 0.84 | 3.89 | 4.17 | 1.77 | 1.47 |
| 2.03 | 0.88 | 1.93 | 0.80 | 3.94 | 4.70 | 6.12 | 4.27 | 0.31 | 4.85 |
| 0.27 | 0.51 | 2.70 | 1.69 | 2.18 | 1.95 | 0.02 | 1.91 | 3.13 | 2.27 |
| 5.39 | 5.45 | 5.45 | 1.39 | 2.85 | 1.41 | 0.36 | 4.34 | 2.44 | 1.60 |
| 5.70 | 2.60 | 3.41 | 1.84 | 5.79 | 0.69 | 2.59 | 1.14 | 5.28 | 3.72 |
| 5.55 | 4.92 | 2.64 | | | | | | | |

The (12)th signalling sequence generation step: the signalling sequence generation step contains two methods, i.e. a first signalling sequence generation method and a second signalling sequence generation method described below. In this embodiment, either one of the following two methods can be used to generate a signalling sequence in the frequency domain, and the two particular methods for generating a signalling sequence are described in detail below.

A first signalling sequence generation method:

1.1 Determine the length and number of a signalling sequence;

1.2 Determine the root value in a CAZAC sequence generation formula based on the length and number of the signalling sequence, wherein the length of the signalling sequence is smaller than or equal to the root value, and the root value is greater than or equal to twice of the number of the signalling sequence. Preferably, the root value is selected as the length of the signalling sequence.

For example, the length (L) of the sequence and the number of signalling are determined. For example, if N bits are to be transmitted, then the number (num) of signalling is $2^N$, and a root of CAZAC sequence is chosen to generate the exp(jπqn(n+1)/root) in the formula. The length (L) of the sequence is smaller than or equal to the root value, and the root value is greater than or equal to 2*num. Generally, the root value is a prime number.

1.3 Select different q values for generating CAZAC sequences, wherein the number of q values is equal to the number of the signalling sequence, and the sum of any two q values is not equal to the root value; and the generated CAZAC sequences should be performed cyclic shift on, and the number of the cyclic shift is determined by the corresponding root value and q value.

For example, number of num different $q_0, q_1, \ldots, q_{num-1}$ are chosen to generate the CAZAC sequence:

$$s(n)=\exp(j\pi qn(n+1)/\text{root}), n=0, \ldots \text{root}-1, \quad \text{(Formula 10)}$$

after the cyclic shift, the sequence is:

$$s_k(n)=[s(k), s(k+1), \ldots s(L-1), s(0), \ldots, s(k-1)] \quad \text{(Formula 11)}$$

where k is the number of the cyclic shift.

It should be noted that, in this embodiment, $q_i(0 \leq i \leq \text{num}-1)$ selected should satisfy the following condition: any two $q_i$ and $q_j(0 \leq 1 \leq i, j \leq \text{num}-1)$ satisfy $q_i+q_j \neq \text{root}$.

Under the above-mentioned condition, a sequence enabling the PAPR of the overall frequency-domain OFDM symbol to be low is preferably selected. Moreover, if L is greater than or equal to 2*num, it is preferably selected that root=L. As such, the auto-correlation value of the sequence is zero.

1.4 Select the signalling sequence from all the CAZAC sequences according to the determined number of signalling sequences. It should be noted that if L=root, then truncation is not required, and the obtained CAZAC sequences can be taken as signalling sequences directly.

For example a continuous partial sequence with a length of L truncated from each sequence among the num sequences, or the entire sequence is taken as a signalling sequence.

By way of example, the signalling sequence has a length of L=353 and a number of num=128, then the root can be selected as the closest prime number 353. The value range of q is 1-352, and the value range of the cyclic shift number of each sequence is 1-353. Among all the selectable signalling sequences, the following 128 sets are preferably selected, the q values and the cyclic shift digits thereof are as shown in q value table of table 2 and cyclic shift digit table of table 3:

A second signalling sequence generation method:

2.1 Determine the length and number of a signalling sequence;

2.2 Determine several root values in a CAZAC sequence generation formula based on the length and number of the signalling sequence, wherein the length of the signalling sequence is smaller than or equal to the minimum value in the selected several root values, and the sum of the selected several root values is greater than or equal to twice of the number of the signalling sequence. Preferably, the root value is selected as the length of the signalling sequence.

For example, the length (L) of the sequence and the number of signalling are determined. For example, if N bits are to be transmitted, then the number (num) of signalling is $2^N$, and a CAZAC sequence is chosen to generate K $\text{root}_k$ $(0 \leq k \leq K-1)$ in the formula $\exp(j\pi qn(n+1)/\text{root})$. The length (L) of the signalling sequence is smaller than or equal to the minimum value in $\text{root}_k$, and the sum of several $\text{root}_k$ is greater than of equal to 2*num, i.e.

$$\sum_{k=0}^{K-1} \text{root}_k \geq 2^*num.$$

Generally, the value of $\text{root}_k$ is a prime number.

2.3 For each root value, select different q values for generating CAZAC sequences, wherein the number of q values is smaller than or equal to ½ of the corresponding root value, and the sum of any two q values is not equal to the corresponding root value; and the generated CAZAC sequences should be performed cyclic shift on, and the number of the cyclic shift is determined by the corresponding root value and q value.

For example, for each $\text{root}_k(0 \leq K \leq K-1)$, $\text{num}_k$ different $q_0$, $q_1$, and $q_{num_k-1}$ are chosen to produce the CAZAC sequences $\exp(k\pi qn(n+1)/\text{root}_k)$, $n=0, \ldots \text{root}_k-1$, where,

TABLE 2 q value table

| 1 | 9 | 10 | 16 | 18 | 21 | 28 | 29 | 32 | 35 | 49 | 51 | 53 | 54 | 55 |
|---|---|----|----|----|----|----|----|----|----|----|----|----|----|----|
| 57 | 59 | 60 | 61 | 65 | 68 | 70 | 74 | 75 | 76 | 77 | 78 | 82 | 84 | 85 |
| 86 | 88 | 90 | 95 | 96 | 103 | 113 | 120 | 123 | 125 | 126 | 133 | 134 | 135 | 137 |
| 138 | 140 | 141 | 142 | 145 | 147 | 148 | 150 | 151 | 155 | 156 | 157 | 161 | 163 | 165 |
| 167 | 170 | 176 | 178 | 179 | 181 | 182 | 184 | 185 | 187 | 194 | 200 | 201 | 204 | 209 |
| 210 | 217 | 222 | 223 | 224 | 225 | 229 | 232 | 234 | 235 | 237 | 239 | 241 | 244 | 246 |
| 247 | 248 | 249 | 251 | 252 | 253 | 254 | 255 | 262 | 270 | 272 | 273 | 280 | 282 | 290 |
| 291 | 306 | 307 | 308 | 309 | 311 | 313 | 314 | 315 | 317 | 320 | 326 | 327 | 330 | 331 |
| 333 | 336 | 338 | 340 | 342 | 345 | 347 | 349 | | | | | | | |

TABLE 3

Cyclic shift number table

| 105 | 244 | 172 | 249 | 280 | 251 | 293 | 234 | 178 | 11 | 63 | 217 | 83 | 111 | 282 |
|-----|-----|-----|-----|-----|-----|-----|-----|-----|----|----|-----|----|-----|-----|
| 57 | 85 | 134 | 190 | 190 | 99 | 180 | 38 | 191 | 22 | 254 | 186 | 308 | 178 | 251 |
| 277 | 261 | 44 | 271 | 265 | 298 | 328 | 282 | 155 | 284 | 303 | 113 | 315 | 299 | 166 |
| 342 | 133 | 115 | 225 | 13 | 26 | 326 | 148 | 195 | 145 | 185 | 121 | 58 | 162 | 118 |
| 151 | 182 | 230 | 39 | 249 | 305 | 309 | 144 | 188 | 181 | 265 | 140 | 212 | 137 | 10 |
| 298 | 122 | 281 | 181 | 267 | 178 | 187 | 177 | 352 | 4 | 353 | 269 | 38 | 342 | 288 |
| 277 | 88 | 124 | 120 | 162 | 204 | 174 | 294 | 166 | 157 | 56 | 334 | 110 | 183 | 131 |
| 171 | 166 | 321 | 96 | 37 | 261 | 155 | 34 | 149 | 156 | 267 | 332 | 93 | 348 | 300 |
| 245 | 101 | 186 | 117 | 329 | 352 | 215 | 55 | | | | | | | |

$$num_k \le \left\lfloor \frac{root_k}{2} \right\rfloor, \text{ and } \sum_{k=0}^{K-1} num_k = num.$$

In the second signalling sequence generation method, for each root value, different q values are chosen to generate the CAZAC sequences, and the generated CAZAC sequences should be performed cyclic shift on, which can refer to the description about method 1 above, and will not be described herein.

It should be noted that, in this embodiment, $q_i$ ($0 \le i \le num_k-1$) selected should satisfy the following condition: any two $q_i$ and $q_j$ ($0 \le i,j \le num_k-1$) satisfy $q_i+q_j \ne root_k$.

Under the above-mentioned condition, a sequence enabling the PAPR of the overall frequency-domain OFDM symbol to be lower is preferably selected. Moreover, it can be preferentially selected that one root=L. As such, the auto-correlation value of the sequence generated by this root is zero.

2.4 Select the signalling sequence from each CAZAC sequence according to the determined number of signalling sequences. It is worth emphasizing that, if one root=L, then the signalling sequence is determined according to the CAZAC sequence generated by the root value which is the length of the signalling sequence.

For example a continuous partial sequence with a length of L cyclically truncated from each sequence among the num sequences, or the entire sequence is taken as a signalling sequence.

By way of example, L=353, num=128. According to the first signalling sequence generation method, it is preferentially selected that the root is 353. Then, it is selected that q=1, 2, . . . 128, and satisfies $q_i+q_j \ne 353$, ($0 \le i, j \le 128-1$). Finally, each sequence is truncated to a length of 353.

For another example, L=350, num=256. According to the second signalling sequence generation method, it is preferentially selected that the root1 is 353 and root2=359, and then for root1=353, 128 sequences are selected in total, i.e. q=1, 2, 3, . . . 128, $q_i+q_j \ne 353$. Then for root2=359, 128 sequences are selected in total, i.e. q=100, 101, 102, . . . 227; to this end, there are 256 sequences in total. Finally, each sequence is cyclically truncated to a length of 353.

In the following, in the (12)th signalling sequence generation step, 512 signalling sequences are generated in total by means of the second signalling sequence generation method, i.e. $Seq_0, Seq_1, \ldots Seq_{511}$; then obtaining the opposite number of each signalling sequence $Seq_0$~$Seq_{511}$, namely, $-Seq_0$~$-Seq_{511}$; the receiving end differentiates a positive sequence from a negative according to the whether a correlation value is positive or negative, which means 10 bits of signalling information is conveyed in total. The 512 signalling sequences can be further divided into 4 groups, each group including 128 signalling sequences. The sub-steps of generating each group of 128 signalling sequence are as follows:

The first substep: generating a reference sequence $zc_i(n)$, which is a Zadoff-Chu sequence zc(n) with a length of N:

$$zc_i(n) = e^{-j\pi \frac{u_i n(n+1)}{N}}, n = 0 \sim N-1, i = 0 \sim 127 \quad \text{(Formula 12)}$$

The second substep: $zc^*_i(n)$ with a length of 2N is produced by copying $zc_i(n)$ twice:

$$zc^*_i(n) = \begin{cases} zc_i(n), 0 \le n < N \\ zc_i(n-N), N \le n < 2N \end{cases} \quad \text{(Formula 13)}$$

$n = 0 \sim N-1, i = 0 \sim 127$

The third substep: truncating a sequence with a length of 353 from a specific start position $k_i$ in $zc^*_i(n)$, to produce $SC_i(n)$:

$$SC_i(n)=zc^*_i(k_i-1+n), n=0\sim352 \quad \text{(Formula 14)}$$

The N value, $u_i$ and shift value $k_i$ of each group of signalling sequences $Seq_0$~$Seq_{127}$ are respectively determined from various corresponding predefined signalling sequence parameter tables below, i.e. table 4 to table 7.

The N value, $u_i$ and shift value $k_i$ of the first group of sequences $Seq_0$~$Seq_{127}$ are as shown in table 4 below.

TABLE 4

| First group of signalling sequence parameters | |
|---|---|
| N | 353 |
| $u_i$, i = 0-127 | 1, 9, 10, 16, 18, 21, 28, 29, 32, 35, 49, 51, 53, 54, 55, 57, 59, 60, 61, 65, 68, 70, 74, 75, 76, 77, 78, 82, 84, 85, 86, 88, 90, 95, 96, 103, 113, 120, 123, 125, 126, 133, 134, 135, 137, 138, 140, 141, 142, 145, 147, 148, 150, 151, 155, 156, 157, 161, 163, 165, 167, 170, 176, 178, 179, 181, 182, 184, 185, 187, 194, 200, 201, 204, 209, 210, 217, 222, 223, 224, 225, 229, 232, 234, 235, 237, 239, 241, 244, 246, 247, 248, 249, 251, 252, 253, 254, 255, 262, 270, 272, 273, 280, 282, 290, 291, 306, 307, 308, 309, 311, 313, 314, 315, 317, 320, 326, 327, 330, 331, 333, 336, 338, 340, 342, 345, 347, 349 |
| $k_i$, i = 0-127 | 105, 244, 172, 249, 280, 251, 293, 234, 178, 11, 63, 217, 83, 111, 282, 57, 85, 134, 190, 190, 99, 180, 38, 191, 22, 254, 186, 308, 178, 251, 277, 261, 44, 271, 265, 298, 328, 282, 155, 284, 303, 113, 315, 299, 166, 342, 133, 115, 225, 13, 26, 326, 148, 195, 145, 185, 121, 58, 162, 118, 151, 182, 230, 39, 249, 305, 309, 144, 188, 181, 265, 140, 212, 137, 10, 298, 122, 281, 181, 267, 178, 187, 177, 352, 4, 353, 269, 38, 342, 288, 277, 88, 124, 120, 162, 204, 174, 294, 166, 157, 56, 334, 110, 183, 131, 171, 166, 321, 96, 37, 261, 155, 34, 149, 156, 267, 332, 93, 348, 300, 245, 101, 186, 117, 329, 352, 215, 55 |

The generation steps of the second group of sequences $Seq_{128}$~$Seq_{255}$ are the same as those of the first group, and the N value, $u_i$ and shift value $k_i$ of thereof are as shown in table 5 below.

TABLE 5

| Second group of signalling sequence parameters | |
|---|---|
| N | 367 |
| $u_i$, i = 0-127 | 8, 9, 10, 15, 19, 21, 31, 34, 39, 49, 58, 59, 71, 76, 80, 119, 120, 121, 123, 140, 142, 151, 154, 162, 166, 171, 184, 186, 188, 190, 191, 193, 194, 195, 198, 203, 204, 207, 208, 209, 210, 211, 212, 214, 215, 219, 220, 221, 222, 223, 224, 226, 228, 230, 232, 233, 235, 236, 237, 239, 240, 241, 243, 245, 249, 250, 252, 254, 257, 259, 260, 261, 262, 263, 264, 265, 266, 267, 269, 271, 272, 273, 275, 276, 277, 278, 281, 282, 283, 284, 285, 286, 289, 294, 297, 299, 302, 303, 306, 307, 310, 311, 312, 313, 314, 316, 317, 321, 322, 323, 326, 327, 329, 331, 332, 334, 338, 340, 342, 344, 345, 347, 349, 351, 356, 361, 363, 366 |
| $k_i$, i = 0-127 | 198, 298, 346, 271, 345, 324, 160, 177, 142, 71, 354, 290, 69, 144, 28, 325, 100, 55, 237, 196, 271, 210, 187, 277, 8, 313, 53, 53, 194, 294, 36, 202, 69, 25, 18, 179, 318, 149, 11, 114, 254, 191, 226, 138, 179, 341, 366, 176, 64, 50, 226, 23, 181, 26, 327, 141, 244, 179, 74, 23, 256, 265, 223, 288, 127, 86, 345, 304, 260, 139, 312, 62, 360, 107, |

TABLE 5-continued

Second group of signalling sequence parameters 201, 301, 263, 257, 184, 329, 300, 81, 121, 49, 196, 201,
94, 147, 346, 179, 59, 212, 83, 195, 145, 3, 119, 152,
310, 31, 134, 54, 187, 131, 63, 276, 294, 142, 246, 54,
181, 121, 273, 276, 36, 47, 16, 199, 243, 235, 194, 348,
95, 262, 52, 210, 115, 250

The generation steps of the third group of sequences $Seq_{256}$~$Seq_{383}$ are the same as those of the first group, and the N value, $u_i$ and shift value $k_i$ of thereof are as shown in table 6 below.

TABLE 6

Third group of signalling sequence parameters

| | |
|---|---|
| N | 359 |
| $u_i$, i = 0-127 | 1, 3, 5, 6, 9, 12, 14, 22, 29, 30, 32, 34, 60, 63, 65, 67, 72, 74, 76, 78, 83, 84, 87, 88, 89, 90, 91, 92, 94, 95, 96, 99, 112, 115, 123, 124, 128, 137, 141, 143, 145, 149, 152, 153, 154, 155, 159, 164, 165, 169, 175, 179, 183, 186, 187, 188, 189, 192, 197, 199, 201, 202, 203, 211, 215, 219, 220, 221, 223, 226, 227, 228, 229, 230, 234, 237, 238, 239, 243, 246, 248, 249, 250, 252, 254, 257, 258, 261, 262, 273, 274, 280, 282, 284, 286, 288, 290, 297, 298, 300, 303, 308, 309, 310, 312, 313, 314, 317, 318, 319, 320, 321, 322, 323, 324, 326, 333, 334, 335, 336, 339, 341, 342, 344, 349, 351, 352, 355 |
| $k_i$, i = 0-127 | 300, 287, 80, 119, 68, 330, 93, 359, 17, 93, 355, 308, 106, 224, 20, 18, 226, 165, 320, 339, 352, 316, 241, 336, 119, 166, 258, 273, 302, 275, 46, 26, 259, 330, 206, 46, 10, 308, 165, 195, 314, 330, 208, 148, 275, 15, 214, 251, 8, 27, 264, 169, 128, 207, 21, 246, 14, 291, 345, 114, 306, 179, 109, 336, 322, 149, 270, 253, 207, 152, 26, 190, 128, 137, 196, 268, 36, 40, 253, 29, 264, 153, 221, 341, 116, 24, 55, 60, 171, 25, 100, 202, 37, 93, 115, 174, 239, 148, 170, 37, 328, 37, 253, 237, 355, 39, 288, 225, 223, 140, 163, 145, 264, 75, 29, 282, 252, 270, 30, 262, 271, 305, 122, 78, 27, 127, 92, 6 |

The generation steps of the fourth group of sequences $Seq_{384}$~$Seq_{511}$ are the same as those of the first group, and the N value, $u_i$ and shift value $k_i$ of thereof are as shown in table 7 below.

TABLE 7

Fourth group of signalling sequence parameters

| | |
|---|---|
| N | 373 |
| $u_i$, i = 0-127 | 26, 28, 29, 34, 38, 40, 43, 49, 54, 57, 58, 62, 64, 65, 79, 80, 81, 83, 85, 86, 87, 101, 102, 187, 189, 190, 191, 193, 194, 195, 196, 198, 199, 200, 202, 204, 205, 206, 208, 209, 211, 213, 214, 216, 217, 218, 219, 220, 221, 222, 223, 224, 225, 227, 228, 230, 232, 233, 236, 237, 241, 243, 245, 246, 247, 248, 249, 250, 251, 252, 253, 255, 256, 259, 260, 261, 262, 263, 265, 266, 267, 275, 276, 280, 282, 283, 284, 285, 289, 295, 297, 300, 301, 302, 303, 305, 307, 317, 320, 322, 323, 325, 327, 328, 332, 338, 341, 342, 343, 348, 349, 351, 352, 353, 355, 356, 357, 358, 359, 360, 361, 362, 363, 364, 367, 369, 370, 372 |
| $k_i$, i = 0-127 | 333, 337, 177, 125, 169, 270, 254, 88, 123, 310, 96, 273, 120, 239, 157, 224, 62, 119, 19, 235, 136, 117, 237, 100, 244, 181, 295, 249, 356, 9, 289, 139, 82, 171, 178, 292, 158, 308, 257, 42, 55, 210, 320, 294, 100, 75, 79, 163, 195, 80, 303, 97, 271, 179, 359, 178, 241, 281, 367, 58, 91, 7, 179, 39, 267, 245, 213, 286, 349, 172, 35, 301, 361, 102, 301, 155, 1, 34, 96, 293, 202, 87, 176, 248, 319, 301, 168, 280, 154, 244, 215, 370, 260, 117, 30, 329, 42, 149, 112, 125, 50, 249, 197, 273, 230, 13, 142, 244, 335, 57, 21, 261, 48, 370, 110, 296, 326, 224, 77, 112, 31, 262, 121, 38, 283, 323, 93, 94 |

In the (13)th arrangement and filling step, the fixed sequences and signalling sequences obtained from the (11)th step and the (12)th step are in an odd-even interlaced arrangement, and after filling virtual subcarriers, the frequency-domain OFDM symbols are formed according to the following formula, $$P1\_X(m) = \begin{cases} 0 & m = 0, 1, \ldots, 158 \\ SC\left(\frac{m-159}{2}\right) & m = 159, 161, 163, \ldots 863 \\ FC\left(\frac{m-160}{2}\right) & m = 160, 162, 164, \ldots 864 \\ 0 & m = 865, 866, \ldots 1023 \end{cases} \quad \text{(Formula 16)}$$

Figure 6:
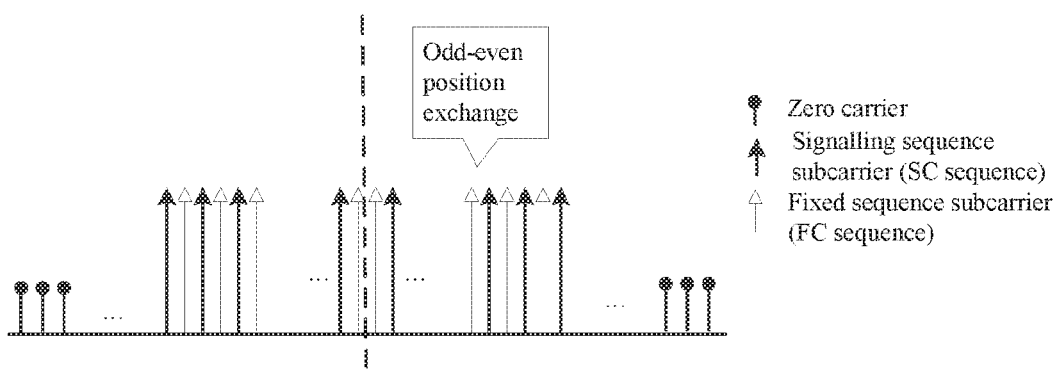
FIG. 6 is a schematic diagram of frequency-domain structure I arranged according to a second predetermined interlaced arrangement rule in the embodiments of the present invention.

FIG. 6 is a schematic diagram of the signalling sequence subcarriers, the fixed sequence subcarriers and the virtual subcarriers arranged according to a second predetermined interlaced arrangement rule in the embodiments of the present invention.

As shown in FIG. 6, a first half part of the signalling sequence at the left side of the dashed line in the figure is placed on odd-numbered subcarriers, and the other half part of the signalling sequence at the right side of the dashed line in the figure is placed on even-numbered subcarrier; and a first half part of the fixed sequence at the left side of the dashed line is placed on even-numbered subcarriers, and the later half part of the fixed sequence at the right side of the dashed line is placed on odd-numbered subcarrier. That is to say, $P1\_X_0, P1\_X_1, \ldots, P1\_X_{1023}$ is generated according to the second predefined interlaced arranged rule; in the first half part, the SC is placed at odd-numbered carriers, and the FC is placed at even-numbered carrier; and in the later half part, the SC is placed at even-numbered carriers, and the FC is placed at odd-numbered carriers. The odd-even positions of the signalling sequence and the fixed sequence in the first and the later half part are interchanged. The odd-even positions of such fixed sequence subcarriers $\overline{FC}$ and signalling sequence subcarriers $\overline{SC}$ can be interchanged, without any influence on the transmission performance.

When filling virtual carriers, i.e. zero sequence subcarriers, the length of the zero sequence subcarriers filled at the left and the right side can also be different, but are inappropriate to be different from each other too much.

Particularly optimized embodiments of frequency-domain symbols generated according to the second predefined interlaced arrangement rule are given below continuously. Generating the frequency-domain OFDM symbol according to the second predefined interlaced arrangement rule comprises the following step:

The (21)th fixed sequence generation step: this fixed sequence generation step is the same as the above-mentioned (11)th fixed sequence generation step, but the value of the fixed sequence subcarriers radian value $\omega_i$ is determined through a second predefined fixed subcarrier radian value table. The second predefined fixed subcarrier radian value table is as shown in table 8:

TABLE 8

Fixed subcarrier radian value table (according to the second predefined interlaced arrangement rule)

| | | | | | | | | | |
|---|---|---|---|---|---|---|---|---|---|
| 0.63 | 2.34 | 5.57 | 6.06 | 0.55 | 5.68 | 2.20 | 1.58 | 2.23 | 4.29 |
| 1.80 | 3.89 | 4.08 | 2.41 | 5.06 | 0.10 | 4.49 | 4.15 | 4.99 | 6.18 |
| 0.86 | 4.31 | 3.08 | 0.73 | 1.67 | 5.03 | 4.26 | 1.73 | 5.58 | 2.74 |
| 5.06 | 1.23 | 1.67 | 1.31 | 2.19 | 5.90 | 2.13 | 3.63 | 3.90 | 0.73 |
| 4.13 | 5.90 | 5.00 | 1.78 | 6.10 | 2.45 | 2.00 | 3.61 | 1.72 | 5.90 |
| 4.07 | 0.39 | 4.72 | 2.73 | 4.67 | 3.56 | 4.13 | 3.07 | 3.74 | 4.87 |

TABLE 8-continued

Fixed subcarrier radian value table (according to the second predefined interlaced arrangement rule)

| | | | | | | | | | |
|---|---|---|---|---|---|---|---|---|---|
| 1.54 | 4.28 | 1.88 | 2.96 | 3.07 | 4.13 | 1.97 | 5.69 | 4.45 | 2.07 |
| 6.05 | 4.88 | 3.39 | 2.55 | 5.83 | 1.86 | 1.65 | 4.23 | 0.46 | 3.24 |
| 1.39 | 0.19 | 0.66 | 4.13 | 4.83 | 2.26 | 2.19 | 3.06 | 5.66 | 0.66 |
| 5.19 | 5.04 | 4.62 | 3.64 | 0.66 | 3.52 | 1.18 | 4.18 | 5.93 | 5.51 |
| 1.05 | 2.18 | 5.87 | 1.27 | 0.92 | 0.66 | 5.75 | 0.16 | 5.04 | 0.54 |
| 5.68 | 0.13 | 4.76 | 0.56 | 1.57 | 1.59 | 4.50 | 3.18 | 0.82 | 3.84 |
| 4.39 | 5.53 | 2.25 | 3.20 | 4.04 | 6.03 | 4.41 | 0.32 | 1.39 | 5.06 |
| 4.67 | 3.20 | 4.63 | 0.88 | 6.00 | 3.99 | 0.31 | 3.72 | 4.17 | 3.37 |
| 4.77 | 0.30 | 4.85 | 2.65 | 0.88 | 3.13 | 1.77 | 6.05 | 0.46 | 1.93 |
| 4.25 | 1.47 | 6.12 | 1.18 | 3.19 | 3.00 | 2.88 | 5.43 | 1.01 | 2.96 |
| 2.16 | 1.17 | 4.77 | 6.07 | 5.32 | 3.55 | 1.64 | 4.35 | 5.10 | 3.87 |
| 2.79 | 4.57 | 0.51 | 3.27 | 2.42 | 1.52 | 1.40 | 0.19 | 0.35 | 4.96 |
| 6.04 | 4.90 | 5.47 | 5.55 | 1.40 | 1.91 | 4.62 | 4.22 | 2.11 | 4.14 |
| 2.33 | 2.75 | 2.68 | 2.06 | 4.86 | 0.34 | 0.47 | 3.13 | 2.97 | 0.05 |
| 5.75 | 1.51 | 6.22 | 2.48 | 5.10 | 5.20 | 2.18 | 2.31 | 4.29 | 3.09 |
| 3.93 | 5.47 | 3.22 | 1.84 | 4.67 | 1.35 | 3.04 | 0.60 | 0.62 | 5.09 |
| 6.04 | 5.39 | 2.71 | 2.47 | 1.86 | 2.69 | 1.75 | 4.94 | 5.98 | 1.08 |
| 5.99 | 3.84 | 3.67 | 5.53 | 1.59 | 5.60 | 1.22 | 5.35 | 4.44 | 2.72 |
| 5.97 | 5.08 | 2.32 | 0.13 | 4.52 | 2.18 | 1.36 | 5.72 | 4.76 | 2.98 |
| 5.30 | 1.71 | 4.31 | 2.05 | 1.68 | 4.61 | 3.86 | 2.52 | 5.36 | 2.39 |
| 3.29 | 1.47 | 6.05 | 0.48 | 5.57 | 1.29 | 4.88 | 5.97 | 0.53 | 0.88 |
| 5.43 | 2.12 | 3.97 | 2.61 | 2.51 | 0.50 | 6.00 | 5.86 | 5.35 | 1.15 |
| 5.38 | 4.42 | 5.05 | 0.96 | 2.41 | 4.84 | 0.79 | 4.99 | 0.51 | 1.32 |
| 5.09 | 1.33 | 2.83 | 2.27 | 4.36 | 0.53 | 5.89 | 4.98 | 5.33 | 2.12 |
| 2.35 | 0.59 | 1.94 | 1.65 | 4.44 | 2.99 | 4.37 | 0.01 | 1.64 | 0.08 |
| 5.34 | 4.09 | 2.14 | 3.31 | 3.69 | 1.38 | 5.95 | 3.31 | 2.44 | 4.81 |
| 4.03 | 4.80 | 0.39 | 3.28 | 4.57 | 0.30 | 4.66 | 2.21 | 4.22 | 2.20 |
| 3.98 | 4.78 | 3.97 | 6.17 | 5.59 | 2.78 | 5.92 | 3.61 | 1.41 | 0.88 |
| 5.24 | 5.47 | 2.38 | 2.42 | 3.22 | 5.38 | 5.02 | 5.10 | 3.06 | 2.43 |
| 1.51 | 4.52 | 4.85 | | | | | | | |

The (22)th signalling sequence generation step: this signalling sequence generation step is the same as the above-mentioned (12)th signalling sequence generation step.

The (23)th arrangement and filling step: the signalling sequences and fixed sequences obtained from the (21)th step and the (22)th step are in an odd-even and then even-odd interlaced arrangement, and after filling zero subcarriers at the left and the right side thereof, the frequency-domain OFDM symbols are formed according to the following formula, $$P1\_X(m) = \begin{cases} 0 & m = 0, 1, \ldots, 158 \\ SC\left(\frac{m-159}{2}\right) & m = 159, 161, \ldots 159 + 176^*2 \\ FC\left(\frac{m-159-1}{2}\right) & m = 160, 162, 160 + 176^*2 \\ FC\left(\frac{m-159}{2}\right) & m = 161 + 176^*2, 163 + 176^*2, 159 + 352^*2 \\ FC\left(\frac{m-159-1}{2}\right) & m = 162 + 176^*2, 164 + 176^*2, \ldots 160 + 352^*2 \\ 0 & m = 865, \ldots 1023 \end{cases} \quad \text{(Formula 17)}$$

Receiving Method

This embodiment also provides a preamble symbol receiving method. The preamble symbol receiving method is applicable to a preamble symbol generated by a transmitting end with a predefined generation rule.

In the predefined generation rule, the generated preamble symbol contains e.g. all the technological factors involved in the first three-segment structure and/or the second three-segment structure described above from the view of time domain in this embodiment, and/or contains all the technological factors involved in for example the frequency-domain structure I described above from the view of frequency domain in this embodiment, which will not be described herein repeatedly. Therefore, in brief, the applicable predefined generation rule contains the above-mentioned preamble symbol generation method described from the view of time-domain and the frequency-domain symbol generation method described from the view of frequency domain without loss of generality.

A preamble symbol generated according to the predefined generation rule respectively has the above-mentioned three-segment structure, and has the above-mentioned frequency-domain structure I. Description is made below with regard to the preamble symbol receiving method.

This embodiment also provides a preamble symbol receiving method, comprising the following steps:

step S11: processing a received signal;

step S12: judging whether the processed signal contains the above-mentioned preamble symbol with a three-segment structure desired to be received; and step S13: in the case where a judgement result above is yes, determining the position of the preamble symbol and resolving signalling information carried by the preamble symbol, wherein the received preamble symbol comprises: a preamble symbol generated by a transmitting end through a free combination of any number of first three-segment structures and/or second three-segment structures according to a predefined generation rule, which contains at least one time-domain symbol.

The first three-segment structure as stated above contains: a time-domain main body signal, a prefix generated based on the entirety or a portion of the time-domain main body signal, and a postfix generated based on the entirety or a portion of a partial time-domain main body signal.

The second three-segment structure as stated above contains: the time-domain main body signal, the prefix generated based on the entirety or a portion of the time-domain main body signal, and a hyper prefix generated based on the entirety or a portion of a partial time-domain main body signal.

As stated in step S11, the received physical frame signal is processed to obtain a baseband signal. A signal received by the receiving end is generally an analogue signal, thus analog-to-digital conversion should be performed thereon to obtain a digital signal at first, then processing such as filtering, down-sampling or the like is performed to obtain the baseband signal. It should be noted that if the receiving end receives an intermediate frequency signal, after performing analog-to-digital conversion processing thereon, frequency spectrum shift is also required, then processing such as filtering, down-sampling or the like is performed to obtain the baseband signal.

As stated in step S12: whether the baseband signal contains the above-mentioned preamble symbol with a three-segment structure desired to be received is judged.

Specifically, first of all, the receiving end will judge whether the received baseband signal contains the preamble symbol desired to be received, i.e. whether the received signal meets a receiving standard; for example, if the receiving end needs to receive data of DVB_T2 standard, whether the received signal contains a preamble symbol of the DVB_T2 standard should be judged; in the same way, here, whether the received signal contains a time-domain symbol with a C-A-B and/or B-C-A three-segment structure needs to be judged.

The steps of judging whether the processed received signal obtained contains the preamble symbol desired to be received, determining the position of the preamble symbol and resolving signalling information carried by the preamble symbol, i.e. the above-mentioned steps S12 and S13, contain at least any one of the following steps: initial timing synchronization, an integer frequency offset estimation, fine timing synchronization, channel estimation, decoding analysis and fractional frequency offset estimation.

Any one or a free combination of any at least two methods can be used to conduct reliability judgement, i.e. judging if the processed signal contains the preamble symbol desired to be received: an initial timing synchronization method, an integer frequency offset estimation method, a fine timing synchronization method, a channel estimation method, a decoding result analysis method and a fractional frequency offset estimation method.

Step S12 contains S12-1 the initial timing synchronization method for preliminarily determining the position of the preamble symbol in the physical frame, and also contains S12-2 judging whether the baseband signal contains the above-mentioned preamble symbol with a three-segment structure desired to be received, base on a result of the initial timing synchronization method. With regard to the initial timing synchronization method, the initial timing synchronization can be completed by using any one or a combination of both of the initial timing synchronization method (①) and the initial timing synchronization method (②) below.

[Initial Timing Synchronization Method (①)]

Initial timing synchronization method (①) is specifically introduced below. Initial timing synchronization method (①) contains the following steps:

conducting necessary inverse processing and/or signalling demodulation on the processed signal using a processing relationship between any two of the three, i.e. the cyclic prefix, the time-domain main body signal and the modulation signal, and performing delayed moving auto-correlation to acquire an accumulation correlation value; and performing delay relationship match and/or a specific mathematical calculation based on the accumulation correlation value, and then using a processed value obtained for the initial timing synchronization, so as to preliminarily determine the position of the preamble symbol.

According to processing relationships and/or modulation relationships between the third part C, the first part A and the second part B in the three-segment structure desired to be received, necessary inverse processing and/or signal demodulation, and then delayed moving auto-correlation are performed on the baseband signal, to obtain any one or any at least two of three accumulation correlation values between the third part C and the first part A, between the first part A and the second part B, and between the third par C and the second part B in the obtained three-segment structure, i.e. $U_{ca}'(n)$, $U_{cb}'(n)$, and $U_{ab}'(n)$. A correlation value to be detected is obtained based on at least one of the accumulation correlation value.

For example, assuming that the three-segment structure is C-A-B structure, based on the delay relationship between the third part C and the first part A, delayed moving auto-correlation is performed on the received signal, for which the delayed correlation expression $U_{ca}(n)$ and the delayed accumulation correlation value $U_{ca}'(n)$ are as follows:

$$U_{ca}(n) = r(n)r^*(n - N_A) \qquad \text{(Formula 18-1; 18-2)}$$

$$U_{ca}'(n) = \frac{1}{Len_C} \sum_{k=0}^{Len_C - 1} U_{ca}(n-k)$$

Energy normalization can optionally be conducted on $U_{ca}'(n)$.

That is, $$U_{ca}'(n) = \frac{U_{ca}'(n)}{0.5 \frac{1}{Len_C} \sum_{k=0}^{Len_C - 1} (|r(n-k)|^2 + |r(n-k-N_A)|^2)} \qquad \text{(Formula 19)}$$

based on the processing relationship between the second part B and the third part C and a modulation frequency offset value, delayed moving auto-correlation and frequency offset demodulation are performed on the received signal, for which the delayed correlation expression $U_{cb}(n)$ and the delayed accumulation correlation value $U_{cb}'(n)$ are as follows:

$$U_{cb}(n) = r(n)r^*(n - N_A - N_A + N1)e^{-jn f_{SH} T} \qquad \text{(Formula 20-1; 20-2)}$$

$$U_{cb}'(n) = \frac{1}{corr\_len} \sum_{k=0}^{corr\_len - 1} U_{cb}(n-k)$$

Also, energy normalization can be conducted on $U_{cb}'(n)$.

Based on the processing relationship between the second part B and the first part A and a modulation frequency offset value, delayed moving correlation is performed on the received signal, for which the delayed correlation expression $U_{ob}(n)$ and the delayed accumulation correlation value $U_{ab}'(n)$ are as follows:

$$U_{ab}(n) = r(n)r^*(n - N_A + N1)e^{-jn f_{SH} T} \qquad \text{(Formula 21-1; 21-2)}$$

$$U_{ab}'(n) = \frac{1}{corr\_len} \sum_{k=0}^{corr\_len - 1} U_{ab}(n-k)$$

Also, energy normalization can be conducted on $U_{ab}'(n)$.

corr_len can not only be valued at $1/f_{SH}T$ to avoid continuous wave interference, but also can be valued $Len_B$ to obtain a sharp peak.

Performing required delay match and mathematical calculation using the delayed accumulation correlation values $U_{ca}'(n)$, $U_{cb}'(n)$, and $U_{ab}'(n)$; the mathematical calculation contains multiplication or addition, using such as $U_{cb}'(n) \cdot U_{ab}'^*(n)$ or $U_{ca}'(n-N_a+N1) \cdot U_{cb}'(n) \cdot U_{ab}'^*(n)$ to obtain a calculation value, i.e. the correlation value 1 to be detected.

Figure 7:
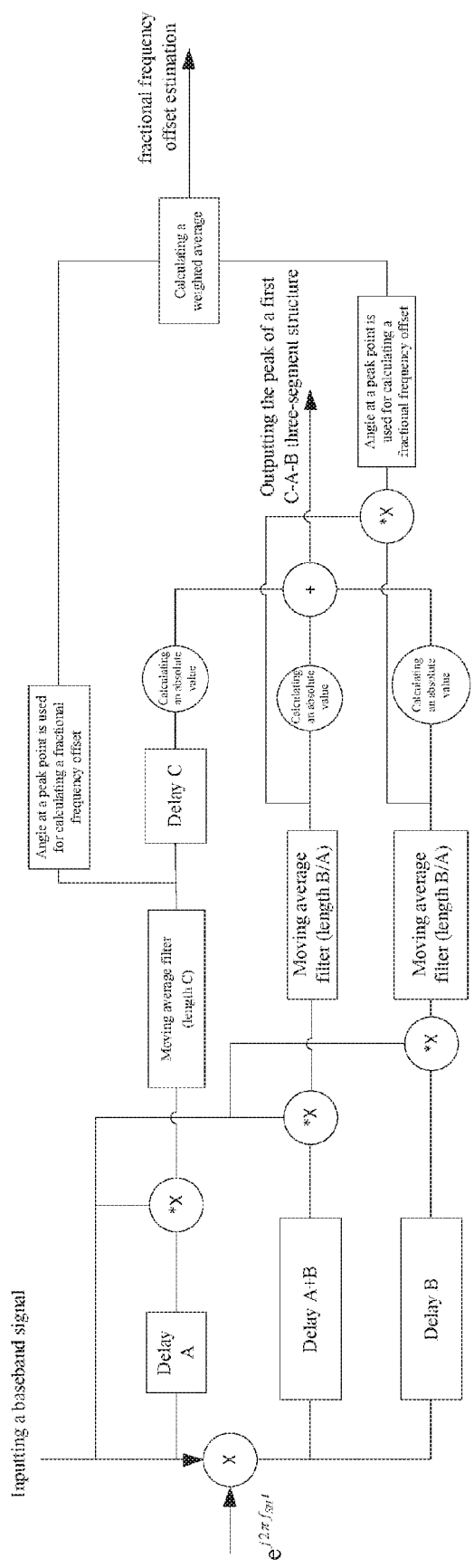
FIG. 7 is a logic diagram of a correlation result to be detected corresponding to a three-segment structure CAB in a preamble symbol receiving method in the embodiments of the present invention.

FIG. 7 is a logic diagram of obtaining correlation result to be detected corresponding to a three-segment structure CAB in the embodiments of the present invention. C, A and B in the Figure respectively indicate the length of segment C, segment A and segment B of a signal, and a moving average filter can be a power normalization filter, where A is $N_A$, B is $Len_B$, and C is $Len_C$.

For example, assuming that the three-segment structure is B-C-A structure, based on the delay relationship between the third part C and the first part A, delayed moving auto-correlation is performed on the received signal, for which the delayed correlation expression $U_{ca}(n)$ and the delayed accumulation correlation value $U_{ca}'(n)$ are as follows:

$$U_{ca}(n) = r(n)r^*(n - N_A) \quad \text{(Formula 22-1; 22-2)}$$

$$U_{ca}'(n) = \frac{1}{Len_C} \sum_{k=0}^{Len_C-1} U_{ca}(n-k)$$

Energy normalization can be conducted on $U_{ca}'(n)$.
That is, $$U_{ca}'(n) = \frac{U_{ca}'(n)}{0.5\frac{1}{Len_C}\sum_{k=0}^{Len_C-1}(|r(n-k)|^2 + |r(n-k-N_A)|^2)} \quad \text{(Formula 23)}$$

Based on the processing relationship between the second part B segment and the third part C segment and a modulation frequency offset value, delayed moving auto-correlation is performed on the received signal, and the frequency offset is demodulated; note that the delayed correlation expression $U_{cb}(n)$ and the delayed accumulation correlation value $U'_{cb}'(n)$ are as follows:

$$U_{cb}(n) = r(n)r^*(n - N_A + N1)e^{-jnf_{SH}T} \quad \text{(Formula 24-1; 24-2)}$$

$$U_{cb}'(n) = \frac{1}{\text{corr\_len}} \sum_{k=0}^{\text{corr\_len}-1} U_{cb}(n-k)$$

Also, energy normalization can be conducted on $U_{cb}'(n)$.

Based on the processing relationship between the second part B segment and the first part A segment and a modulation frequency offset value, delayed moving correlation is performed on the received signal, for which the delayed correlation expression $U_{ab}(n)$ and the delayed accumulation correlation value $U_{ab}'(n)$ are as follows:

$$U_{ab}(n) = r(n)r^*(n - N_A - N_A + N1)e^{-jnf_{SH}T} \quad \text{(Formula 25-1; 25-2)}$$

$$U_{ab}'(n) = \frac{1}{\text{corr\_len}} \sum_{k=0}^{\text{corr\_len}-1} U_{ab}(n-k)$$

Also, energy normalization can be conducted on $U_{ab}'(n)$.

corr_len can be valued $1/f_{SH}T$ to avoid continuous wave interference, or can be valued $Len_B$ to enable a peak to be sharp.

Performing required delay match and mathematical calculation by using the delayed accumulation correlation values $U_{ca}'(n)$, $U_{cb}'(n)$, and $U_{ab}'(n)$; the mathematical calculation contains addition or multiplication, using such as $U_{cb}'^*(n-N_A)\cdot U_{ab}'(n)$ or $U_{ca}'(n)\cdot U_{cb}'^*(n-N_A)\cdot U_{ab}'(n)$ to obtain a calculation value, i.e. the correlation value 2 to be detected.

Figure 8:
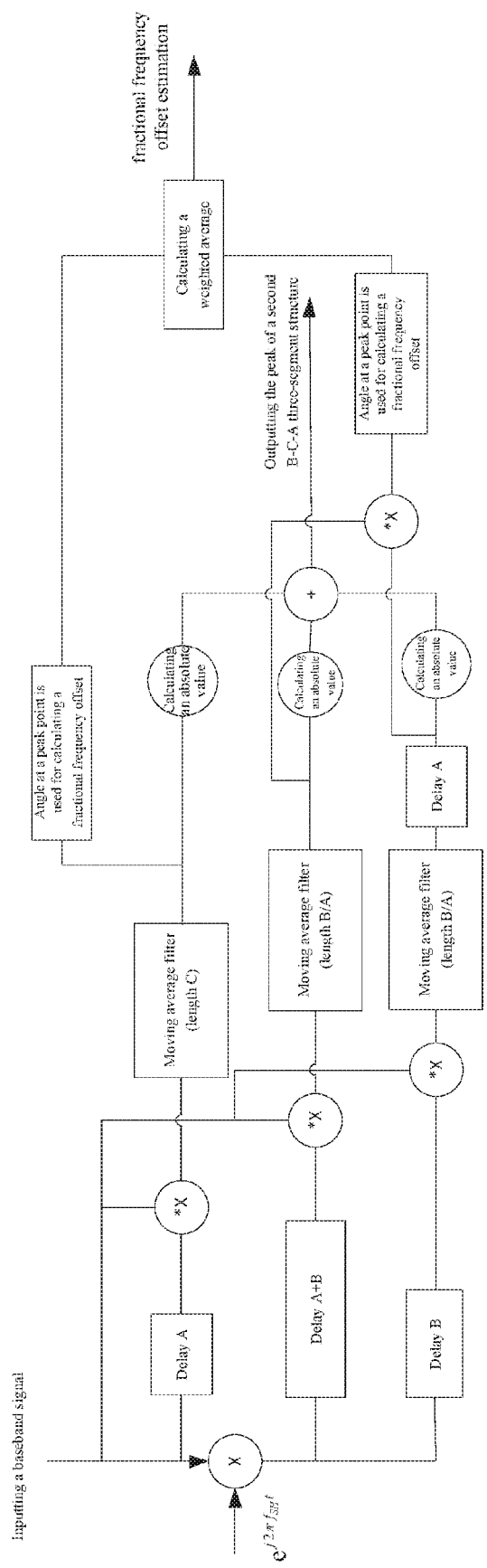
FIG. 8 is a logic diagram of a correlation result to be detected corresponding to a three-segment structure BCA in a preamble symbol receiving method in the embodiments of the present invention.

FIG. 8 is a logic diagram of obtaining correlation result to be detected corresponding to a three-segment structure BCA in the embodiments of the present invention.

Only one set of receiving resources are needed for the same portion in FIG. 7 and FIG. 8, they are shown in a separated mode for the sake of clarity. C, A and B in the Figure respectively indicate the length of segment C, segment A and segment B of a signal, and a moving average filter can be a power normalization filter, where A is $N_A$, B is $Len_B$, and C is $Len_C$.

A correlation value for preliminary timing synchronization are formed based on the correlation result 1 to be detected and/or the correlation result 2 to be detected.

Further, when both the following two situations (a) and (b) are contained in preamble symbol transmission, (a) the time-domain main body signal contains known information;

(b) and it is detected that the time-domain symbol has the C-A-B three-segment structure, the initial timing synchronization can be completed by means of any one or a combination of both of the above-mentioned initial timing synchronization method (①) and the initial timing synchronization method (②) below. When the two synchronization methods are completed, a first preliminary synchronization calculation value obtained via the initial timing synchronization method (①) and a second preliminary synchronization calculation value obtained via the initial timing synchronization method (②) are weighted, and initial timing synchronization is completed based on the weighted arithmetic value.

[Initial Timing Synchronization Method (②)]

Initial timing synchronization method (②) is specifically introduced in the following.

When any C-A-B and/or B-C-A main body signal A contains known information, such as a fixed subcarrier, or such as when a preamble symbol contains several time-domain symbols with a C-A-B and/or a B-C-A three-segment structure, and a main body signal A of some of the time-domain symbols is a known signal, that is, when any time-domain main body signal in the preamble symbol contains a known signal, the initial timing synchronization method (②) comprises: performing differential operation on the time-domain main body signal A in accordance with predefined N differential values, and performing differential operation on a time-domain signal corresponding to known information as well, then correlating the two to obtain N sets of differential correlated results corresponding to the N differential values on a one-to-one basis, and performing initial synchronization based on the N sets of differential correlated results to obtain processed values which are used for preliminarily determining the position of the preamble symbol, where $N \geq 1$.

The particular process of differential correlation in the initial timing synchronization method (②) is described below; and a single set of differential correlation process is introduced at first.

A differential value is determined; differential operation is conducted on received baseband data according to the differential value; differential operation is also performed on a local time-domain sequence corresponding to known information according to the differential value; and then results of the two differential operations are correlated, to obtain a differential correlation result corresponding to the differential value. The calculation process for the single set of differential correlation result is same with the prior art. Assuming that the differential value is D, and the received baseband data is $r_n$; and the description for each particular formula is as follows:

First of all, differential operation is conducted on the received baseband data according to the differential value $$z_m^{(D)} = r_m r_{m-D}^* \quad \text{(Formula 26)}$$

After the differential operation, phase rotation brought about by carrier frequency offset has become a fixed carrier phase $e^{j2\pi D\Delta f}$, where $\Delta f$ indicates the carrier frequency offset.

At the same time, differential operation is also performed on the a time-domain sequence (such as, obtaining the corresponding time-domain sequence by filling fixed subcarriers according to corresponding positions, and adding zero at the rest of the positions and performing IFFT)

$$c_n^{(D)}=s_n S_{n-D}^* n=D, \ldots, L-1 \quad \text{(Formula 27)}$$

The received data after the differential operation and the local differential sequence are correlated, to obtain $$R_{dc,m}^{(D)} = \sum_{n=D}^{L-D} Z_{n+m}^{(D)}[c_n^{(D)}]^* \quad \text{(Formula 28)}$$

In the case where a system has neither multipath nor noise, $$R_{dc,m}^{(D)} = \sum_{n=D}^{L-D} Z_{n+m}^{(D)}[c_n^{(D)}]^* = e^{j2\pi D\Delta f}\sum_{n=D}^{L-D} c_{n+m}^{(D)}[c_n^{(D)}]^* \quad \text{(Formula 29)}$$

$R_{dc,m}^{(D)}$ can well provide a correlation peak, and the peak is not affected by the carrier offset. A frame synchronization/timing synchronization position is obtained using the following formula $$\hat{n}_0 = \arg\max_m\{|R_{dc,m}^{(D)}|\} \quad \text{(Formula 30)}$$

It can be seen from the above-mentioned process of single set of differential correlation calculation that a differential correlation algorithm can resist the influence from any large carrier frequency offset; however, since differential operation is performed on a received sequence at first, signal noise is enhanced, and with a low signal-to-noise ratio, the noise enhancement is very serious, leading to significant deterioration of the signal-to-noise ratio.

In order to avoid the aforementioned problem, not only a single set of different value is used for correlation calculation, a plurality of sets of differential correlation calculations can be implemented, for example, taking the value of N to be 64 to implement 64 sets of differential correlation, thus obtaining $R_{dc(0),m}^{(D(0))}, R_{dc(1),m}^{(D(1))}, \ldots, R_{dc(N-1),m}^{(D(N-1))}$. $D(0), D(1), \ldots, D(N-1)$ are the N different differential values selected.

Specific mathematical calculation is performed on N results, to obtain a final correlation result.

In this embodiment, with respect to a plurality of sets of differential correlation calculations (64 sets), a differential value can be selected either of the two predefined differential selection rule based on the performance requirement of a transmission system:

(1) a first predefined differential selection rule: the differential value D(i) is arbitrarily selected as N different values and satisfies D(i)<L, where L is the length of a local time-domain sequence corresponding to the known information.

(2) a second predefined differential selection rule: the differential value D(i) is N different values in arithmetic progression and satisfies D(i)<L, i.e. D(i+1)−D(i)=K, and K is a constant integer satisfying $$K < \frac{L}{N},$$

where L is the length of a local time-domain sequence corresponding to the know information.

Predefined processing calculation are performed on the N (64) results to obtain a final correlation result, there are two preferred embodiments for the predefined processing calculation here, and elaboration will be provided respectively.

First predefined processing calculation:

the differential value D(i) can be arbitrarily selected as N different values and satisfies D(i)<L. Due to the arbitrarily selected differential value D(i), the phase $e^{j2\pi D(i)\Delta f}$ i=0, ..., N−1 after each set of differential correlation is different from one another, and can not be directly added as vectors, addition or average can be only conducted on weighted absolute values. Predefined processing calculation are performed on N different differential correlation results through the following formula, to obtain a final differential result. The formula below is an example of obtaining a final differential result by absolute value addition.

$$R_{dc,m} = \sum_{i=0}^{N-1} \text{abs}(R_{dc(i),m}^{(D(i))}) \quad \text{(Formula 31)}$$

$$i = 0, \ldots N-1$$

Second predefined processing calculation:

the differential value D(i) can be arbitrarily selected as N different values and satisfies D(i)<L, and satisfies that D(i) is a arithmetic progression, i.e. D(i+1)−D(i)=K; and K is a constant integer satisfying $$K < \frac{L}{N}.$$

differential values are selected according to such rules; after obtaining a differential correlation value such as $R_{dc(0),m}^{(D(0))}, R_{dc(1),m}^{(D(1))}, \ldots, R_{dc(N-1),m}^{(D(N-1))}$, conjugate multiplication are conducted on adjacent two sets of differential correlation values, to obtain N−1 values after the conjugate multiplication through the following formula.

$$RM_{i,m}=R_{dc(i),m}^{(D(i))}\cdot(R_{dc(i+1),m}^{(D(i+1))})^*$$
$$i=0,1,2,\ldots,N-2 \quad \text{(Formula 32)}$$

Originally different phases $e^{j2\pi D(i)\Delta f}$ for each set are changed into the same phase $e^{j2\pi K\Delta f}$ by means of the conjugate multiplication; therefore, weighted vector addition or average can be conducted on the obtained N−1 sets of $RM_{i,m}$ to obtain the final differential result, thus obtaining better performance than the first predefined processing calculation. The formula below is an example of obtaining a final differential result by vector addition.

$$R_{dc,m} = \sum_{i=0}^{N-2} RM_{i,m} \quad \text{(Formula 33)}$$

$$i = 0, \ldots N-1$$

It should be noted that, when the differential value D(i) is obtained using the above-mentioned second predefined differential selection rule, a final correlation result can not only be obtained by conducting weighted vector addition or average on values after conjugate multiplication according to the second predefined processing calculation, the final correlation result but also can be obtained by directly conducting weighted absolute value addition or average on at least two differential correlation result according to the above-mentioned first predefined processing calculation.

A correlation value for initial timing synchronization is obtained based on the calculation $R_{dc,m}$.

Regardless of whether the initial timing synchronization method (①) or the initial timing synchronization method (②), assuming that a received signal contains a desired preamble symbol, the position of the maximum value of the correlation value for initial timing synchronization located in a certain range can be taken as the position of the preamble symbol in the physical frame. A value corresponding to this value is used to further judge whether the received signal contains the desired preamble symbol, or the position is used to conduct subsequent calculations, such as an integral frequency offset estimation and/or decoding, so as to further judge whether the received signal contains the desired preamble symbol.

Based on a result of the above-mentioned initial timing synchronization, whether the processed signal, i.e. the baseband signal, contains the above-mentioned preamble symbol with a three-segment structure desired to be received is judged. It particularly comprises: making detection based on a result of initial timing synchronization, if the detected result satisfies a pre-set condition, then it is determined that the baseband signal contains the preamble symbol containing the three-segment structure and desired to be received. Further, satisfaction of the pre-set condition here can not only refer to the fact that a result of initial timing synchronization itself satisfies a pre-set condition, but also can refer to the fact that when whether the condition is satisfied cannot be determined enough according to the result of initial timing synchronization itself, whether the condition is satisfied is further determined according to subsequent other steps, such as an integer frequency offset estimation and/or decoding result.

Assuming that the judgement is made directly according to the result of initial timing synchronization, the judgement can be made based on whether a pre-set condition is satisfied; the pre-set condition contains making a judgement by performing specific calculation on the result of initial timing synchronization, and then judging whether the maximum value of a calculation result exceeds a threshold.

Specifically, in the particular implementation of the above-mentioned initial timing synchronization method ①, two sets of delayed accumulation correlation values can be obtained according to a predefined acquisition rule and/or a predefined processing rule between part C, part A and part B of the first three-segment structure and the second three-segment structure, and each set include 3 values; two sets of correlation results to be detected are generated using at least one of the three delayed accumulation correlation values in each of the 2 sets; thus the results are detected, and whether the preamble symbol contains a three-segment structure, and which three-segment structure is contained are judged.

For example, if the first set of correlation results to be detected satisfy the pre-set condition, then it is determined that the baseband signal contains a preamble symbol with the first three-segment structure; if the second set of correlation results to be detected satisfy the pre-condition, then it is determined that the baseband signal contains a preamble symbol with the second three-segment structure; and the two sets both satisfy the pre-set condition, then it indicates that the preamble symbol contains the two three-segment structures at the same time.

When the transmitting end transmits signalling using different start points of selecting the second part (i.e. the postfix/modulation signal) from the first part (i.e. the time-domain main body signal), the initial timing synchronization parses emergency broadcast through any one or a free combination of any two of: differently sending emergency broadcast and common broadcast by utilizing different delay relationships between the same content in the third part and the second part, and different delay relationships between the same content in the first part and second part, so as to send emergency broadcast and common broadcast differentially.

By way of example, the receiving end will implement step S12-1 contained in step S12 in a plurality of branches: the initial timing synchronization method for preliminarily determining the position of the preamble symbol, and then based on a plurality of correlation results to be detected, judging whether a preamble symbol desired to be received exists, and parsing transmitted time-domain signalling.

For example, when B is obtained by truncating the preamble symbol from different start point positions N1 of A, and the start point positions can be used for transmitting Q bit(s) of signalling, the delayed moving correlation for some value N1 above is defined as a branch. Each branch contains the above-mentioned 3 delayed accumulation correlation values. The receiving end implements the above-mentioned delayed moving auto-correlation branch with 2Q different N1 values, and then judges whether the desired preamble symbol exists according to the absolute value of 2Q $U_2'(n) \cdot U_3'^*(n)$ or $U_{ca}'(n-N_A+N1) \cdot U_{cb}'(n) \cdot U_{ab}'^*(n)$.

If neither of the absolute values exceeds a threshold, then it indicates that the baseband signal does not contain a signal desired to be received. Such as, N1 is valued 504 or 520 to transmit 1 bit of emergency alarm or broadcast system identifier, wherein N1=520 indicates a normal preamble symbol, and N1=504 indicates an emergency alarm or broadcast system; then step S21-1 is carried out in 2 branches.

For example, for a branch in which an emergency alarm broadcast flag is 0, i.e. N1=520, the following are adopted:
performing moving auto-correlation on the received signal which is delayed by 1024 sampling points with the received signal;
performing moving auto-correlation on the received signal which is delayed by 1528 sampling points with the received signal of which a frequency offset is demodulated;
performing moving auto-correlation on the received signal which is delayed by 504 sampling points with the received signal of which a frequency offset is demodulated, and For example, for a branch in which an emergency alarm broadcast flag is 1, i.e. N1=504, the following are adopted:
performing moving auto-correlation on the received signal which is delayed by 1024 sampling points with the received signal of which a frequency offset is demodulated;
performing moving auto-correlation on the received signal which is delayed by 1544 sampling points with the received signal of which a frequency offset is demodulated;
performing moving auto-correlation on the received signal which is delayed by 520 sampling points with the received signal of which a frequency offset is demodulated.

When a threshold is taken as a pre-set condition to judge whether the baseband signal contains the preamble symbol desired to be received, if the maximum value of the correlation value to be detected of a branch with N1=520 exceeds the threshold, the it indicates that the baseband signal is a desired signal, and a preamble symbol appears EAS_flag=0; on the contrary, if the maximum value of the correlation value to be detected while N1=504 exceeds the threshold, it indicates that EAS_flag=1; and if neither of the two sets exceeds the threshold, it indicates that the baseband signal is not a desired signal.

When the preamble symbol utilizes only one of the first three-segment structure and the second three-segment structure to identify non-emergency broadcast, the other one is used to identify emergency broadcast; and parsing is conducted through the following.

The above-mentioned step S12-1 for two branches can be conducted according to the predefined acquisition rule and/or the predefined processing rule between part C, part A and part B of the first three-segment structure and the second three-segment structure, and each branch includes 3 values; and step S12-2 contains detecting a correlation value to be detected of each of the two branches. If a detection result for a first branch satisfies a pre-set condition, then it is determined that the baseband signal contains the first three-segment structure desired to be received, and it indicates that EAS_flag=0; if a detection result for a second branch satisfies a pre-set condition, then it is determined that the baseband signal contains the second three-segment structure desired to be received, and it indicates that EAS_flag=1; and if it is the case where the two branches both satisfy the condition, another judgement should be made, for example, emergency broadcast can be judged according to the obviousness of two peak-to-noise ratios.

Further, after the initial timing synchronization is preliminarily completed, initial timing synchronization results from method (①) and/or method (②) are used for fractional frequency offset estimation.

When a preliminary timing synchronization method (①) is used, a second fractional frequency offset value can be calculated by taking the angle of the maximum value in $U_{ca}'(n)$; after conducting conjugate multiplication on $U_{cb}'(n)$ and $U_{ab}'(n)$ (corresponding to a C-A-B structure) or conducting conjugate multiplication on $U_{ab}'(n)$ and $U_{cb}'(n-N_A)$ (corresponding to a B-C-A structure), a third fractional frequency offset value can be calculated by taking an angle corresponding to the maximum value. As shown in the schematic portion in FIG. 7 and FIG. 8 above, an angle in a logical calculation block is used for obtaining the fractional frequency offset, and fractional frequency offset estimation can be conducted using any one or two of the second fractional frequency offset and the third fractional frequency offset.

For an algorithm for fractional frequency offset estimation, by way of example, when a preliminary timing synchronization method (②) is used, $$R_{dc,m} = \sum_{i=0}^{N-2} RM_{i,m}$$

$$i = 0, \ldots N-1,$$

the maximum value thereof is taken, and a corresponding phase is $e^{j2\pi K\Delta f}$; $\Delta f$ can be calculated and converted to the first fractional frequency offset value.

When the sent preamble symbol contains features required in implementing the preliminary timing synchronization method (①) and the preliminary timing synchronization method (②), a fractional frequency offset estimation value is obtained using any one or a combination of any two of the first, the second and the third fractional frequency offset value.

It should be noted that, considering the influence of offset in system sampling, in the above-mentioned embodiment, a delay number that there should be can be adjusted in a certain range, for example, incrementing or decrementing the delay number that some delayed correlator by one, to obtain three delay numbers, i.e. the delay number per se, the delay number incremented by one, and the delay number decremented by one; then a plurality of delayed moving auto-correlation are then performed according to the obtained adjusted delay numbers and the delay number that there should be, for example, implementing delayed moving auto-correlation according to the three delay numbers, then selecting the one with the most obvious correlation result; at the same time, a timing offset can be estimated using the correlation result.

Without loss of generality, if the preamble symbol contains other time-domain properties besides having a C-A-B or B-C-A structure, besides using the timing synchronization method with the above-mentioned C-A-B or B-C-A structural feature, using a timing synchronization method directed at other time domain structural features does not depart from the scope of description of the present invention.

Step S12-2 contains the initial timing synchronization method for preliminarily determining the position of the preamble symbol in a physical frame. Further, after initial synchronization, the integer frequency offset estimation can further be conducted based on a result obtained from the initial timing synchronization method.

Further, when the time-domain main body signal A correspond to the above-mentioned frequency-domain structure, the receiving end can also perform an integral multiple of frequency offset estimation using a fixed sequence, that is, the preamble symbol of the present invention can also be used for the integral multiple of frequency offset estimation in the following steps:

1) truncating a signal containing the fixed subcarrier, according to the determined position of the preamble symbol;

2) performing calculation on the received signal containing a fixed subcarrier, with a frequency-domain fixed subcarrier sequence or a time-domain signal corresponding to the frequency-domain fixed subcarrier sequence, so as to realize an integer frequency offset estimation.

Explanation below is provided for the integer frequency offset estimation method based on the result of the initial timing synchronization, and the steps of the integer frequency offset estimation include any one or a combination of any two of the particular methods below:

a first integral multiple of frequency offset estimation method contains: according to a result of the initial timing synchronization, truncating to get a section of time-domain signal containing the entirety or a portion of the time-domain main body signal, modulating the truncated section of time-domain signal with different frequency offsets in a frequency sweeping mode, to obtain N swept-frequency time-domain signals corresponding to the offset values on one-to-one basis, after performing moving correlation between a known time-domain signal obtained by performing inverse Fourier transform on a known frequency-domain sequence and each swept-frequency time-domain signal, determining the greatest correlation peak of N correlation results by comparison, and a modulation frequency offset value in which a swept-frequency time-domain signal corresponding to the greatest correlation result being the integral multiple of frequency offset estimation value; and/or a second integer frequency offset estimation method contains:

performing Fourier transform on the time-domain signal of which the length of the time-domain main body signal is truncated according to the result of the initial timing synchronization, conducting cyclic shift on the obtained frequency-domain subcarriers in different shift values in a frequency sweeping range, truncating to get a received sequence corresponding to a valid subcarrier, performing predefined calculation and then inverse transform on the received sequence and the known frequency-domain sequence, choosing among several inverse transform results corresponding to shift values on one-to-one basis to obtain a corresponding shift value, and obtaining the integral multiple of frequency offset estimation value according to a corresponding relationship between a shift value and an integral multiple of frequency offset estimation value.

The integral frequency offset estimation method is described in particular by way of example. For example, the time-domain main body signal correspondingly has the above-mentioned frequency-domain structure I, that is, the frequency-domain OFDM symbol comprises three parts respectively, i.e. virtual subcarriers, signalling sequence (referred to as SC) subcarriers and fixed sequence (referred to as FC) subcarriers, then a known frequency-domain sequence recited below is a fixed subcarrier.

The first integral multiple of frequency offset estimation method contains: according to a result of the initial timing synchronization, truncating to get a section of time-domain waveform containing the entirety or a portion of the time-domain main body signal, modulating the section of time-domain waveform with different frequency offsets in a frequency sweeping mode, i.e. in a fixed frequency changingstep, such as corresponding to an integer subcarrier spacing, to obtain several time-domain signals $$A1_y(nT)=r(nT)\cdot e^{j2\pi ynTfs/N_A}$$ (Formula 34)

where T is the sampling period, and $f_s$ is the sampling frequency. The time-domain signal obtained by filling with known frequency-domain sequence in a predefined subcarrier filling mode and performing inverse Fourier transform on same is A2; and moving correlation is performed on A2, which is taken as a known signal, and each $A1_y$, so as to select the $A1_y$ which corresponds to the maximum correlation peak, then the corresponding modulation frequency offset value y is the integral multiple of frequency offset estimation value.

The frequency sweeping range corresponds to a frequency offset range requirement that the system needs to meet, for example, the system needs to cope with a frequency offset of 500 k, and a sampling rate of the system is 9.14 M, and the main body of the preamble symbol has a length of 2 k, then the frequency sweeping range is $$\pm \left\lceil \frac{500\text{K} \times 2048}{9.14\text{M}} \right\rceil,$$

i.e. [−114, 114].

The second integral multiple of frequency offset estimation method contains: according to the position where the preamble symbol appears detected by the initial timing synchronization, truncating to get the time-domain main body signal A, and performing FFT on same; performing cyclic shift with different shift values on the frequency-domain subcarrier after FFT in a frequency-sweeping range; after that, truncating to get received sequence corresponding to valid subcarriers; performing some calculation (generally, conjugate multiplication, or division) on the received sequence and the known frequency-domain sequence; performing IFFT on a result of the calculation; and performing specific calculation on a result of the IFFT, such as taking the path with the largest energy, or taking the accumulation of several paths with large energies. With the several shift values, after several times of IFFT, several calculation results will be obtained. Which shift value corresponds to the integer frequency offset estimation is judged based on the several calculation results, thus obtaining an integer frequency offset estimation value.

A typical judgement method is based on several results, and a shift value corresponding to the result with the maximum energy is selected as the integer frequency offset estimation value.

When the time-domain main body signal A corresponds to the above-mentioned frequency-domain structure I, the following integral frequency offset estimation method can also be adopted.

The integer frequency offset estimation method comprises: truncating some symbol in a preamble symbol to get a time-domain main body signal A and performing Fourier transform on same to obtain a frequency-domain OFDM symbol, performing cyclic shift in the frequency sweeping range on the frequency-domain OFDM symbol obtained by transform, conducting interlaced differential multiplication according to the position of the FC on the subcarrier and an interval between two fixed sequence subcarriers, i.e. the former one and the later one, and performing correlation calculation on interlaced differential multiplication value of the known fixed sequence subcarriers to obtain a series of correlation values, and selecting the cyclic shift corresponding to the maximum correlation value, thus being able to accordingly obtain the integral frequency offset estimation value.

There are many particular algorithms for integer frequency offset estimation, which will not be described here anymore.

Further, after the integer frequency offset estimation, the frequency offset is compensated, and thus the transmitted signalling is parsed.

Further optionally, after the integral frequency-offset estimation is completed, precise timing synchronization is performed using the known information in the preamble symbol.

For example, when the frequency-domain structure I is adopted, fine timing synchronization is conducted using a fixed subcarrier sequence (FC) contained by one or more time-domain symbols; and In the case where the above-mentioned judgement result in step S12-3 below is yes, the step of determining the position of the preamble symbol in the physical frame and solving signalling information carried by the preamble symbol will be described in detail, and the step contains:

determining the position of the preamble symbol, comprising: based on a detection result satisfying a pre-set condition, determining the position of the preamble symbol in the physical frame; and if a preamble symbol desired to be received exists, determining the position of the preamble symbol according to a greater correlation value to be detected or the greatest correlation value to be detected.

The step of parsing transmitted signalling further contains a channel estimation method, For example, in the case of having the frequency-domain structure I, channel estimation is completed using a received signal containing the fixed sequence subcarrier and a known frequency-domain fixed subsequence subcarrier and/or a time-domain signal obtained by performing inverse Fourier transform thereon, and this can also chosen to be carried out in the time domain and/or in the frequency domain, which will not be described here anymore.

Further, when a frame format parameter and/or an emergency broadcast content in the preamble symbols is solved, the position of a subsequent signalling symbol and the position of a data symbol can be obtained according to the content of the parameter and the determined position of the preamble symbol, and parse subsequent signalling symbol or data symbol is parsed on this basis.

The step of solving signalling information carried by the preamble symbol in step S12-3 is explained continuously. The step of parsing a signalling signal comprises: solving signalling information carried by the preamble symbol by utilizing the entirety or a portion of a time-domain waveform of the preamble symbol and/or a frequency-domain signal obtained from the entirety or a portion of the time-domain waveform of the preamble symbol through Fourier transform.

The signalling parsing process is explained with respect to the frequency-domain structure I below.

The signalling information carried by signalling sequence subcarriers in the preamble symbol is solved by performing calculation using the received signal and a signalling sequence subcarrier set containing the signalling sequence subcarriers, or a time-domain signal corresponding to the signalling sequence subcarrier set. The set of signalling sequence subcarriers is produced based on a set of known signalling sequences.

The signal containing the signalling sequence subcarriers comprises: the entire or a partial of a time-domain waveform of the received preamble symbol, and one or more frequency-domain OFDM symbols obtained by performing Fourier transform on one or more time-domain OFDM symbols truncated from the preamble symbol. The set of signalling sequence subcarriers is a set formed by filling the valid subcarriers with various signalling sequences in the set of signalling sequences s.

Specifically, one or more frequency-domain OFDM symbols are obtained by performing Fourier transform on one or more truncated time-domain symbol corresponding to the length $N_A$ of the OFDM symbol; then zero subcarriers are removed, and one or more received frequency-domain signalling subcarriers are taken out according to the positions of the signalling subcarriers. A specific mathematical calculation is conducted on the one or more received frequency-domain signalling subcarriers with the above-mentioned channel estimation value and the known set of signalling sequence subcarriers, to complete a frequency-domain decoding function.

For example, let i=0:M−1, M denotes the number signalling subcarriers, and j=0:$2^P$−1, P denotes the number of bits of signalling transmitted in the frequency domain, that is, the corresponding set of signalling subcarriers has $2^P$ elements in total, and each element corresponds to a sequence with a length of M; $H_i$ be a channel estimation value corresponding to each signalling subcarrier, SC_rec$_i$ is a received frequency-domain signalling subcarrier value, and SC$_i^j$ is the ith value of the jth element in the set of signalling sequence subcarriers. Then $$corr_j = \text{Re}\left(\sum_{i=0}^{M-1} \text{SC\_rec}_i H_i^* SC_i^{*j}\right)$$

$$j = 0: 2^P - 1,$$

information about the signalling transmitted in the frequency domain can be obtained by taking j corresponding to max (corr$_j$).

In other embodiments, the previous process can also be carried out in the time domain; and the information about the signalling transmitted in the frequency domain can also be solved by filling with zeros at appropriate positions of the known signalling sequence subcarrier set to generate a frequency-domain symbol with a corresponding length, then performing inverse Fourier transform to obtain a time-domain signalling waveform set, directly conducting synchronization correlation on the waveform set with a received time-domain signal of which the accurate position has been acquired, then taking a correlation value with the maximum absolute value, which will not be described here anymore.

This embodiment also provides the preamble symbol generation device, the frequency-domain symbol generation device and the preamble symbol receiving device in Content of the invention. The preamble symbol generation device, the frequency-domain symbol generation device and the preamble symbol receiving device respectively correspond to the preamble symbol generation method, the frequency-domain symbol generation method and the preamble symbol receiving method in the above-mentioned embodiments. Therefore, the structure and technological factors of the devices can be obtained by correspondingly converting the generation method and the receiving method, which will not be described herein, and no explanation will be provided.

The present invention has been disclosed above with the preferred embodiments which, however, are not intended to limit the present invention, and any person skilled in the art could make possible changes and alterations to the technical solutions of the present invention using the disclosed method and technical contents described above without departing from the spirit and scope of the present invention. Therefore, any simple alteration, equivalent change and modification which are made to the above-mentioned embodiments in accordance with the technical substance of the present invention and without departing from the contents of the present invention, will fall within the scope of protection of the technical solutions of the present invention.

The invention claimed is:
1. A preamble symbol transmitting method comprising:
generating a cyclic prefix according to a partial time-domain main body signal truncated from a rear of a time-domain main body signal by processing the partial time-domain main body signal according to a first predefined processing rule;
generating a modulation signal based on a portion or an entirety of the partial time-domain main body signal by processing the portion or the entirety of the partial time-domain main body signal according to a second predefined processing rule;

generating a time-domain symbol based on at least the cyclic prefix and the modulation signal, wherein the preamble symbol contains the time-domain symbol; and transmitting a signal comprising the preamble symbol;

wherein the first predefined processing rule comprises:
  directly copying the partial time-domain main body signal; or
  multiplying the partial time-domain main body signal by a fixed coefficient or a predefined variable coefficient, and wherein the second predefined processing rule comprises:
  performing modulation to generate the modulation signal when the first predefined processing rule comprises directly copying; or
  when the first predefined processing rule comprises multiplying the partial time-domain main body signal by the fixed coefficient or the predefined variable coefficient, multiplying the partial time-domain main body signal by the fixed coefficient or the predefined variable coefficient and then performing modulation to generate the modulation signal.

2. The preamble symbol transmitting method of claim 1, characterized in that:
  the time-domain symbol is generated based on the cyclic prefix, the time-domain main body signal and the modulation signal which are arranged successively.

3. The preamble symbol transmitting method of claim 1, characterized in that:
  the length of the modulation signal does not exceed the length of the cyclic prefix.

4. The preamble symbol transmitting method of claim 1, characterized in that:
  generating the modulation signal using the partial time-domain main body signal comprises:
  setting a frequency shift sequence; and
  multiplying the portion or the entirety of the partial time-domain main body signal by the frequency shift sequence to obtain the modulation signal corresponding to the time-domain main body signal.

5. The preamble symbol transmitting method of claim 4, characterized in that:
  a modulation frequency offset value of the frequency shift sequence is determined based on a frequency-domain subcarrier spacing corresponding to the portion or the entirety of the partial time-domain main body signal of the time-domain symbol, or a length of the modulation signal, wherein an initial phase of the frequency shift sequence is an arbitrary value.

6. The preamble symbol transmitting method of claim 1, characterized in that:
  the preamble symbol transmits signalling information in the following ways:
  on a premise of giving a combination of a length of the cyclic prefix and a length of the modulation signal, while generating the modulation signal, the partial time-domain main body signal is truncated, and the transmission of different signalling information is realized by truncating the partial time-domain main body signal at different start positions during the truncation.

7. The preamble symbol transmitting method of claim 1, characterized in that:
  a length of the time-domain main body signal is 2048 sampling periods; a length of the cyclic prefix is 520 sampling periods; a length of the modulation signal is 504 sampling periods; and a start position to generate the modulation signal by truncation in the time-domain main body signal is a 1544th sample.

8. The preamble symbol transmitting method of claim 1, characterized in that:
  let $P1\_A(t)$ be a time-domain expression of the time-domain symbol, and $N_A$ denotes a length of the time-domain signal, $Len_C$ denotes a length of the cyclic prefix, $Len_B$ denotes a length of the modulation signal, $f_{SH}$ denotes a modulation frequency offset value for modulating the time-domain main body signal, and $T$ denotes a sampling period, then the time-domain expression of the time-domain symbol of the preamble symbol containing the cyclic prefix, the time-domain main body signal and the modulation signal is:

$$P_{C-A-B}(t) = \begin{cases} P1\_A(t + (N_A - Len_C)T) & 0 \le t < Len_C T \\ P1\_A(t - Len_C T) & Len_C T \le t < (N_A + Len_C)T \\ P1\_A & (N_A + Len_C)T \le t < \\ (t - (Len_C + N_A - N1) - T)e^{j2\pi f_{SH} t} & (N_A + Len_C + Len_B)T \\ 0 & \text{otherwise} \end{cases}$$

9. The preamble symbol transmitting method of claim 8, characterized in that:
  the length of the time-domain main body signal $N_A$ is 2048, the length of the cyclic prefix $Len_C$ is 520, and the length of the modulation signal is $Len_B$ is 504, then the time-domain expression of the time-domain symbol of the preamble symbol containing the cyclic prefix, the time-domain main body signal and the modulation signal is:

$$P_{C-A-B}(t) = \begin{cases} P1\_A(t + 1528T) & 0 \le t < 520T \\ P1\_A(t - 520T) & 520T \le t < 2568T \\ P1\_A(t - 1024T)e^{j2\pi f_{SH} t} & 2568T \le t < 3072T \\ 0 & \text{otherwise} \end{cases}$$

$$f_{SH} = 1/(2048)T.$$

10. The preamble symbol transmitting method of claim 1, characterized in that:
  the time-domain main body signal carries an emergency broadcast identifier using at least one bit of signalling; and
  when the modulation signal with a modulation signal length is truncated from the time-domain main body signal according to different start positions, the different start positions of truncation in the time-domain main body signal carry the emergency broadcast identifier.

11. The preamble symbol transmitting method of claim 1, characterized in that:
  the time-domain main body signal is obtained by processing a frequency-domain symbol.

12. The preamble symbol transmitting method of claim 11, characterized in that:
  the frequency-domain symbol is generated by arranging a fixed sequence and a signalling sequence, which are respectively generated in a frequency domain, and filling valid subcarriers with the fixed sequence and the signalling sequence.

13. A preamble symbol transmitting and receiving method comprising:
generating a cyclic prefix according to a partial time-domain main body signal truncated from a rear of a time-domain main body signal by processing the partial time-domain main body signal according to a first predefined processing rule, wherein the first predefined processing rule comprises:
directly copying the partial time-domain main body signal; or
multiplying the partial time-domain main body signal by a fixed coefficient or a predefined variable coefficient;
generating a modulation signal based on a portion or an entirety of the partial time-domain main body signal by processing the portion or the entirety of the partial time-domain main body signal according to a second predefined processing rule, wherein the second predefined processing rule comprises:
performing modulation to generate the modulation signal when the first predefined processing rule comprises directly copying; or
when the first predefined processing rule comprises multiplying the partial time-domain main body signal by the fixed coefficient or the predefined variable coefficient, multiplying the partial time-domain main body signal by the fixed coefficient or the predefined variable coefficient and then performing modulation to generate the modulation signal;
generating a time-domain symbol based on at least the cyclic prefix and the modulation signal, wherein the preamble symbol contains the time-domain symbol; and
transmitting a signal comprising the preamble symbol;
receiving the signal;
processing the received signal;
determining whether the processed signal contains the preamble symbol; and
upon determining that the processed signal contains the preamble symbol, determining a position of the preamble symbol and resolving signalling information carried by the preamble symbol.

14. The preamble symbol transmitting and receiving method of claim 13, characterized in that:
the steps of determining whether the processed signal contains the preamble symbol, and determining the position of the preamble symbol and resolving the signalling information carried by the preamble symbol comprise at least one of the following:
an initial timing synchronization method, an integer frequency offset estimation method, a channel estimation method, and a fractional frequency offset estimation method.

15. The preamble symbol transmitting and receiving method of claim 13, characterized in that:
the step of determining whether the processed signal contains the preamble symbol uses result of at least any one of the following:
an initial timing synchronization method, an integer frequency offset estimation method, a channel estimation method, and a fractional frequency offset estimation method.

16. The preamble symbol transmitting and receiving method of claim 13, characterized in that:
the steps of judging step of determining whether the processed signal contains the preamble symbol comprises the following steps:

preliminarily determining the position of the preamble symbol by means of an initial timing synchronization method; and
based on a result of the initial timing synchronization method, determining whether the processed signal contains the preamble symbol.

17. The preamble symbol transmitting and receiving method of claim 16, characterized in that:
the initial timing synchronization method comprises:
a first initial timing synchronization method comprising:
conducting inverse processing or signal demodulation on the processed signal using an association relationship between any two of the cyclic prefix, the time-domain main body signal and the modulation signal, and then performing a delayed moving auto-correlation to acquire an accumulation correlation value; and
performing a specific mathematical calculation based on the accumulation correlation value, and then using a processed value obtained for the initial timing synchronization, so as to preliminarily determine the position of the preamble symbol; or
a second initial timing synchronization method comprising:
when the time-domain main body signal in the preamble symbol contains a known signal, conducting differential operation on the time-domain main body signal according to N predefined differential values to produce a first differential operation result, and also conducting differential operation on the time-domain signal corresponding to the known signal to produce a second differential operation result, then correlating the first differential operation result and the second differential operation result to obtain N groups of differential correlation results corresponding to the N differential values on a one-to-one basis, and performing initial synchronization based on the N groups of differential correlation results to obtain processed values, for preliminarily determining the position of the preamble symbol, where $N \geq 1$;
wherein when the determination of the position of the preamble symbol is completed based on the first initial timing synchronization method or the second initial timing synchronization method, weighting the processed values obtained respectively, and completing the initial timing synchronization using the weighted results.

18. The preamble symbol transmitting and receiving method of claim 13, characterized in that:
the steps of determining the position of the preamble symbol and resolving signalling information carried by the preamble symbol comprise:
resolving the signalling information carried by the preamble symbol using all or some of time-domain signals of the preamble symbol or using frequency-domain signals obtained by transforming all or some of the time-domain signals of the preamble symbol.

19. The preamble symbol receiving method of claim 13, characterized in that:
the time-domain main body signal is obtained by processing a frequency-domain symbol; and
the frequency-domain symbol is generated by arranging a fixed sequence and a signalling sequence, which are respectively generated in a frequency domain, and filling valid subcarriers with the fixed sequence and the signalling sequence.

\* \* \* \* \*